(12) United States Patent
Asai

(10) Patent No.: US 9,799,090 B2
(45) Date of Patent: Oct. 24, 2017

(54) MEMORY CONTROL DEVICE, MOBILE TERMINAL, AND COMPUTER-READABLE RECORDING MEDIUM

(71) Applicant: Sharp Kabushiki Kaisha, Osaka-shi, Osaka (JP)

(72) Inventor: Junki Asai, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 101 days.

(21) Appl. No.: 14/425,122

(22) PCT Filed: Aug. 28, 2013

(86) PCT No.: PCT/JP2013/073018
§ 371 (c)(1),
(2) Date: Mar. 2, 2015

(87) PCT Pub. No.: WO2014/038451
PCT Pub. Date: Mar. 13, 2014

(65) Prior Publication Data
US 2015/0235343 A1 Aug. 20, 2015

(30) Foreign Application Priority Data
Sep. 7, 2012 (JP) ................................ 2012-197787

(51) Int. Cl.
*G06T 1/60* (2006.01)
(52) U.S. Cl.
CPC ..................................... *G06T 1/60* (2013.01)
(58) Field of Classification Search
CPC ........................................................ G06T 1/60

USPC .......................................................... 345/534
See application file for complete search history.

(56) References Cited

U.S. PATENT DOCUMENTS

| 2003/0210217 A1* | 11/2003 | Lee ....................... G09G 3/2011 345/89 |
| 2004/0061530 A1* | 4/2004 | Tanigawa ................. H04N 5/46 326/93 |
| 2005/0105001 A1* | 5/2005 | Yui .......................... G06F 3/14 348/441 |
| 2006/0034326 A1 | 2/2006 | Anderson et al. |
| 2006/0161691 A1 | 7/2006 | Katibian et al. |
| 2006/0164424 A1 | 7/2006 | Wiley et al. |
| 2006/0168496 A1 | 7/2006 | Steele et al. |
| 2006/0171414 A1 | 8/2006 | Katibian et al. |
| 2006/0179164 A1 | 8/2006 | Katibian et al. |
| 2006/0179384 A1 | 8/2006 | Wiley et al. |

(Continued)

FOREIGN PATENT DOCUMENTS

| JP | 2005-124167 A | 5/2005 |
| JP | 2011-041290 A | 2/2011 |

*Primary Examiner* — Ke Xiao
*Assistant Examiner* — Kim-Thanh T Tran
(74) *Attorney, Agent, or Firm* — Keating & Bennett, LLP

(57) ABSTRACT

A memory control device of the present invention comprises a determination section (34) for determining whether a time point of start of a writing operation falls within a risky period; and a delay control section (32) for delaying, in a case where the determination section (34) determines that the time point of the start of the writing operation falls within the risky period, a time point of the start of one of the writing operation and the reading operation which one is higher in operation rate, said one of the writing operation and the reading operation being delayed by a predetermined delay period.

12 Claims, 12 Drawing Sheets

(56) References Cited

U.S. PATENT DOCUMENTS

| | | |
|---|---|---|
| 2006/0288133 A1 | 12/2006 | Katibian et al. |
| 2008/0036631 A1 | 2/2008 | Musfeldt |
| 2008/0043276 A1* | 2/2008 | Escott ..................... G06F 5/14 358/1.15 |
| 2010/0188574 A1* | 7/2010 | Hung ................... H04N 7/0132 348/500 |

* cited by examiner

MEMORY CONTROL DEVICE, MOBILE TERMINAL, AND COMPUTER-READABLE RECORDING MEDIUM

TECHNICAL FIELD

The present invention relates to a memory control device, a mobile terminal including the memory control device, a memory control program, and a computer-readable recording medium in which the memory control program is stored, each allowing writing, in a frame memory, data transferred from a host processor, and reading data written in the frame memory and transferring the read data to a display panel such as an LCD (Liquid Crystal Display).

BACKGROUND ART

In general, in a case where image data is transferred from a host processor (hereinafter merely referred to as "host") to a display panel such as an LCD, the image data is temporarily stored in a frame memory (hereinafter merely referred to as "memory") in an LCDC (LCD controller) and then output to the display panel. Consequently, when display data is not updated, it is unnecessary to transfer the image data from the host.

However, in a seamless process such as video image reproduction, input (writing) of image data from the host to the LCDC (frame buffer) and output (reading) of image data from the LCDC to the display panel are carried out substantially concurrently.

Consequently, in a case where a difference in transfer rate of image data between input and output cannot be compensated completely, so-called tearing occurs, which is an overtaking phenomenon of image data, in which phenomenon incomplete image data stored in a memory is output to a display panel. Furthermore, the output of incomplete image data to the display panel in the tearing causes flickers in image display.

An example of a prior art for preventing such tearing is a frame rate changing device disclosed in Patent Literature 1. The frame rate changing device includes memory control means for inputting/outputting data into/from a common memory, overtake prediction means for predicting a frame at which output of data from the memory overtakes input of data into the memory, and memory-writing control means for stopping writing of data into the memory when the overtake prediction means predicts that overtaking will occur.

Patent Literature 2 discloses a method for updating a buffer. This is a method for carrying timing information via a communication link between a first processor and a second processor. Furthermore, in this method, the communication link is in a halt mode, and a time event is scheduled in the first processor in order to carry the timing information to the second processor. Furthermore, in this method, link wakeup is started by the first processor when the time event is generated, the second processor detects the link wakeup, and the first processor and the second processor are synchronized with each other with respect to the carried timing information with use of detected link wakeup timing.

CITATION LIST

[Patent Literature 1]
Japanese Patent Application Publication No. 2005-124167 (published on May 12, 2005)

[Patent Literature 2]
Japanese Patent Application Publication No. 2011-41290 (published on Feb. 24, 2011)

SUMMARY OF INVENTION

Technical Problem

However, the above prior techniques have problems below.

Conventionally, as above, writing into a frame buffer for a single frame and reading from the frame buffer are made concurrently. Consequently, in a frame buffer for display, start of reading for display output cannot be stopped. This necessitates, as in the techniques described in the above Patent Literatures, (1) Wait for timing when no tearing is expected to occur and then start writing, or (2) Giving up starting writing at timing when tearing is expected to occur.

For example, in the case (1), every time when a host updates image data for display, the host waits for safe timing, and in a worst case, there is a possibility that the host is required to wait for a time equal to one frame at maximum. This causes a problem that since a frame buffer of the host cannot be freed until data transfer for updating image data is completed, the host is required to wait before the host starts to generate image data after next, even if the host has a double buffer structure, resulting in drop frame. Furthermore, even when next image data is not updated, the host cannot stop its operation until image transfer is completed, and consequently power is consumed wastefully for a certain time.

On the other hand, in the case (2), there is no choice to give up writing, resulting in drop frame.

The present invention is made in view of the foregoing conventional problems. An object of the present invention is to provide a memory control device etc. capable of avoiding drop frame and reducing wasteful power consumption such as power consumed while a host waits.

Solution to Problem

In order to solve the foregoing problem, a memory control device in accordance with one aspect of the present invention is a memory control device which conducts (i) a writing operation in which data transferred from a host is written in a frame memory and (ii) a reading operation in which the data is read out from the frame memory so as to transfer the data to a display control section, the memory control device comprising: a determination section for determining, in a case where a readout period from start of the reading operation to end of the reading operation is different in length from a writing period from start of the writing operation to end of the writing operation, whether start of the writing operation falls within a risky period which is predetermined based at least on a difference between the readout period and the writing period; and a delay section for delaying, in a case where the determination section determines that the start of the writing operation falls within the risky period, the start of one of the reading operation and the writing operation which one is higher in operation rate, said one of the reading operation and the writing operation being delayed by a predetermined delay period which is predetermined based on a difference between the readout period and the writing period.

Advantageous Effects of Invention

With one aspect of the present invention, it is possible to avoid a frame from being dropped and reduce wasteful power consumption such as power consumed while a host waits. Furthermore, as a secondary effect, since display is made, without a host being required to wait, at a time when the host intends to make display, there is no temporal variation between frames of a motion image, thereby eliminating a motion judder phenomenon.

For a fuller understanding of the nature and advantages of the invention, reference should be made to the ensuing detailed description taken in conjunction with the accompanying drawings.

DESCRIPTION OF EMBODIMENTS

The following description will discuss an embodiment of the present invention with reference to FIGS. 1 through 12. Descriptions of configurations other than configurations described in specific items below can be omitted according to need. In a case where such configurations are described in other items, the configurations thus omitted are the same as those described in the other items. For convenience, members having the same functions as those described in items are given the same reference signs and their descriptions are omitted appropriately.

[Image Transfer System 1]

Figure 1:
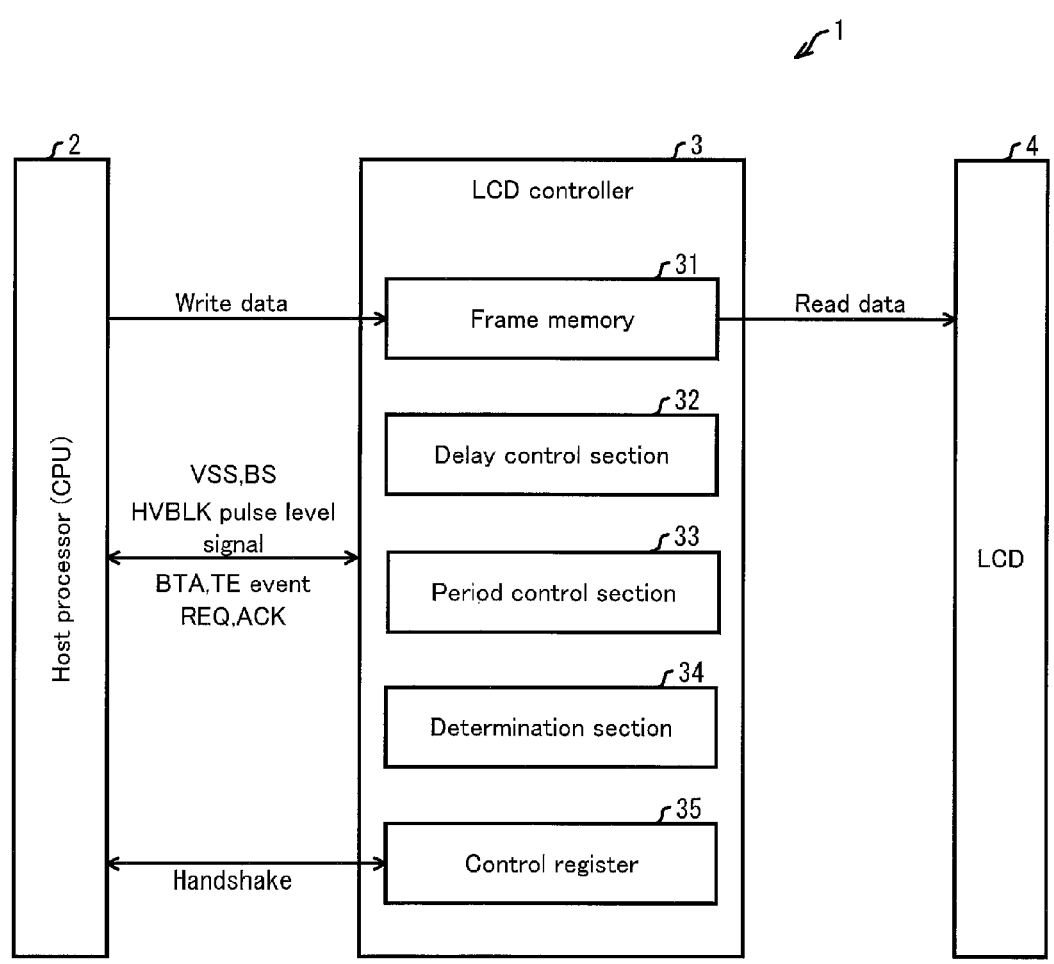
FIG. 1 is a block diagram illustrating an embodiment of a memory control device of the present invention.

Firstly, with reference to FIG. 1, a description will be discussed below as to an image transfer system 1 in accordance with an embodiment of the present invention. FIG. 1 is a block diagram illustrating a configuration of the image transfer system 1.

As illustrated in FIG. 1, the image transfer system 1 includes a host processor 2, an LCD controller 3, and an LCD 4. The image transfer system 1 in accordance with the present embodiment is a device which conducts (i) a writing operation in which image data (data) transferred from the host processor 2 is written in a frame memory 31 (later described) and (ii) a reading operation in which image data is read out from the frame memory 31 so as to transfer the image data thus read out to the LCD 4. Note that, in the specification, a configuration, in which the LCD 4 (and/or host processor 2) is removed from the image transfer system 1, corresponds to a memory control device in accordance with one embodiment of the present invention.

(Host Processor 2)

The host processor 2 is a host processor (CPU; Central Processing Unit) for a device body (e.g. mobile terminal 10 illustrated in FIG. 2). The host processor 2 carries out an overall control (process) of the device body, and transfers, to the LCD controller 3, (i) image data to be transferred to the LCD 4, (ii) various signals such as a REQ (Request) signal, (iii) various control commands such as a handshake flag and BTA (Bus Turnaround; bus occupancy right), and (iv) packets such as a VSS (Vertical Sync Start) packet and a BS (Blanking Start) packet.

(LCD Controller 3)

The LCD controller 3 has a mechanism for inputting and outputting image data, and carries out processes such as an (i) operation in which image data transferred from the host processor 2 is written in the frame memory 31, and (ii) an operation in which image data is read out from the frame memory 31 so as to transfer the image data thus read out to the LCD 4.

As illustrated in FIG. 1, the LCD controller 3 includes at least the frame memory 31, a delay control section (delay section) 32, a period control section (period adjusting section) 33, a determination section 34, and a control register 35.

(Frame Memory 31)

The frame memory 31 is an image memory capable of storing image data corresponding to one (1) frame transferred from the host processor 2.

(Delay Control Section 32)

In a case where the determination section 34 (described later) determines that a time point of start of the writing operation falls within a predetermined risky period (described later), the delay control section 32 delays, by a predetermined delay period (described later), a time point of start of one of the reading operation and the writing operation which one is higher in operation rate. Note that the readout period Tout is a time period from start of the reading operation to end of the reading operation. On the other hand, the writing period Tin is a time period from start of the writing operation to end of the writing operation.

(Period Control Section 33)

Figure 7:
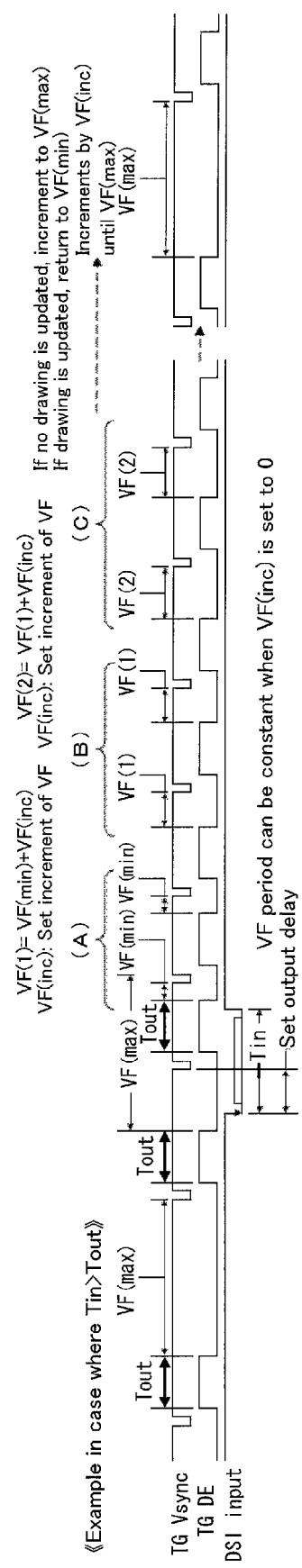
FIG. 7 is a timing chart illustrating an example of an operation of automatic suspension driving in the operation of the memory control device.

With reference to FIGS. 1 and 7, the following description will discuss an operation of the period control section 33. FIG. 7 is a timing chart illustrating an example of an operation of automatic suspension driving.

The period control section 33 adjusts a length of a front porch period (set VF period, vertical front porch period) of each frame period in the reading operation of image data. The operation of the period control section 33 will be detailed later. The "front porch period" is a time period from start of a vertical blanking period to start of a vertical sync signal.

When image data from the host processor 2 is not updated, the period control section 33 in accordance with the present embodiment can adjust a front porch period VF(n) (described later) in such a manner that a VF period increments by VF (inc) from the minimum value VF(min) to the maximum value VF(max) with respect to each VF(step) frame cycle. On the other hand, when image data from the host processor 2 is updated, the period control section 33 in accordance with the present embodiment restores the front porch period VF(n) to the minimum value VF(min). The set VF period can be constant with respect to each frame when VF(inc) is set to 0.

To be more specific, as illustrated in FIG. 7, the "front porch period" can be adjusted in length in such a manner as to meet a relation VF(n)=VF(n−1)+VF(inc) (n is an integer; VF(inc) is an increment of VF). VF(step) is the number of serial outputs of fixed VF(n) in each frame.

For example, (A) illustrated in FIG. 7 shows a case where VF(0) is fixed to VF(min) and VF(step)=2. In this case, a front porch period of VF(min) is outputted sequentially two times.

(B) illustrated in FIG. 7 shows a case where VF(1) is fixed to VF(0)+VF(inc)=VF(min)+VF(inc) and VF(step)=2. In this case, a front porch period of VF(1) is outputted sequentially two times.

(C) illustrated in FIG. 7 shows a case where VF(2) is fixed to VF(1)+VF(inc) and VF(step)=2. In this case, a front porch period of VF(2) is outputted sequentially two times. When VF(inc)=0, the VF period is always constant with respect to each frame.

(Determination Section 34)

The determination section 34 carries out various determination processes such as determining whether a time point where the writing operation starts falls within the risky period in a case where the readout period Tout and the writing period Tin have different lengths, and determining whether the time point of start of the writing operation falls within a time period from start of the risky period or end of the risky period to end of the reading operation.

(Control Register 35)

The control register 35 stores control commands supplied from the host processor 2 and transmits a control command stored in the control register 35 to the host processor 2. Examples of the control commands include various data used to, for example, set parameters in sections (circuit). Examples of the various data encompass specified values for calculating an image size, a line size, a frequency, a transfer waiting time, and a risky period. Examples of the control command which the control register 35 supplies to or receives from the host processor 2 encompass a handshake flag (described later).

(LCD 4)

The LCD 4 (display control section) displays image data transferred from the host processor 2 via the LCD controller 3.

The LCD 4 in accordance with the present embodiment is a liquid crystal panel using a semiconductor oxide (hereinafter referred to as "semiconductor oxide liquid crystal panel." An example of the oxide is an oxide including indium, gallium, and zinc).

[Characteristic Operation of Image Transfer System 1]

(Case where Writing Period Tin>Readout Period Tout)

Next, with reference to FIGS. 3, 4, and 11, a description will be provided below as to a characteristic operation of the image transfer system 1, which operation is conducted in a case where a writing period Tin>a readout period Tout. Before the description of the characteristic operation conducted by the image transfer system 1, a description will be first provided as to definitions of terms important in discussing the following operations.

"Risky period" (indicated by "risky" in the drawing) is a time period which has been predetermined based on at least a difference between the readout period Tout and the writing period Tin with use of, as a reference, a time point where the reading operation ends. Note that the term "at least" is used in consideration of a case where the risky period=(difference between readout period Tout and writing period Tin)+(predetermined margin). Note, however, that, for convenience, the following description is on the premise that the risky period=|readout period Tout−writing period Tin|=writing period Tin−readout period Tout.

"Delay period" indicates a time period which has been predetermined based on the difference between the readout period Tout and the writing period Tin. Note that it is preferable that the "delay period" is equal to or longer than the difference between the readout period Tout and the writing period Tin. For example, the "delay period" can be set such that "delay period"=|readout period Tout−writing period Tin|+(a predetermined margin)=writing period Tin−readout period Tout+(a predetermined margin). For convenience, the following description is on the premise that "delay period"=|readout period Tout−writing period Tin|=writing period Tin−readout period Tout.

(Flow of Determination on Whether Start of Writing Operation Falls within Risky Period or not and Flow of Delay Control)

Figure 3:
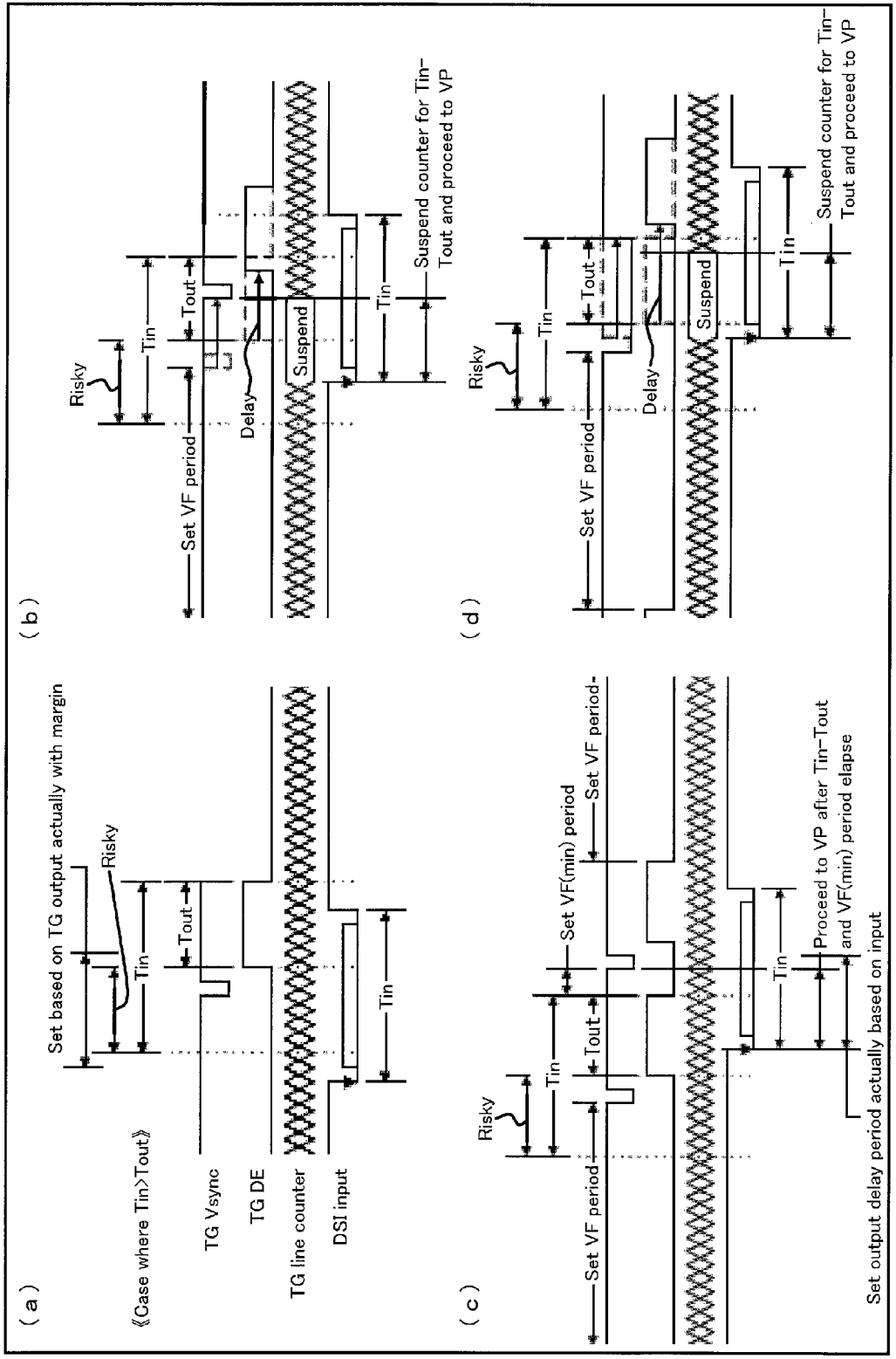
FIG. 3 is a timing chart illustrating examples of an operation of the memory control device. (a) of FIG. 3 illustrates an example of the operation conducted in a case where a time point of start of a writing operation does not fall within a risky period. (b) of FIG. 3 illustrates an example of the operation conducted in a case where the time point of start of the writing operation falls within the risky period. (c) of FIG. 3 illustrates an example of the operation conducted in a case where start of the writing operation falls within a time period from end of the risky period to end of the reading operation. (d) of FIG. 3 illustrates an example of the operation conducted in a case where transfer of data from a host to an LCD controller is started at substantially the same time as a predetermined time point of start of the reading operation.

(a) and (b) of FIG. 3 are timing charts illustrating respective examples of the operation of the image transfer system 1.

(a) of FIG. 3 first illustrates an example of the operation conducted in a case where a time point of start of a writing operation (a time point indicated by a downward arrow titled "DSI input" or a time point where information which is always transferred before the writing operation of image data, is received (later described)) does not fall within the risky period. (b) of FIG. 3 illustrates an example of the operation conducted in a case where the time point of start of the writing operation falls within the risky period.

The example illustrated in (b) of FIG. 3 shows an operation conducted in a case where an operation rate of the reading operation>an operation rate of the writing operation (writing period Tin>readout period Tout). In this case, when the determination section 34 determines that a time point where the writing operation is started falls within the risky period, the delay control section 32 in accordance with the present embodiment suspends, by the delay period, a line counter for generating a line address used in transferring image data to the LCD controller 3, thereby delaying a time point of start of the reading operation (time point of a rising edge of a pulse represented by TG DE (Data Enable from Timing Generator).

Consequently, in a case where an operation rate of the reading operation>an operation rate of the writing operation, a time point of start of the reading operation is delayed by a predetermined delay period at least including a time period substantially corresponding to a difference in operation rate between the reading operation and the writing operation, i.e. |readout period Tout−writing period Tin|. This allows start of reading to be avoided in a time period during which tearing is highly likely to occur.

(Flow of Case where Start of Writing Operation Falls within Time Period from End of Risky Period to End of Reading Operation)

(c) of FIG. 3 illustrates the operation conducted in a case where start of the writing operation falls within a time period from end of the risky period to end of the reading operation.

In a case where the determination section 34 determines that start of the writing operation falls within a time period from end of the risky period to end of the reading operation of image data in a previous frame, the period control section 33 illustrated in FIG. 1 shortens a length of the front porch period (set VF period), thereby advancing start of the reading operation of image data in a present frame.

This allows the written data to be outputted after a shortest time possible.

On the other hand, in a case where the determination section 34 does not determine that start of the writing operation falls within a time period from end of the risky period to end of the reading operation of image data in a previous frame, the period control section 33 illustrated in FIG. 1 causes the length of the front porch period to be equal to or longer than the length of a front porch period of the previous frame (see FIG. 7 and the description on the operation of the period control section 33). This allows power consumption to be automatically reduced in a case where no data is written.

(Flow of Case where Transfer of Image is Started Substantially at the Same Time as Predetermined Time Point of Start of Reading)

(d) of FIG. 3 illustrates the operation conducted in a case where transfer of image data from the host processor 2 to the LCD controller 3 is started at substantially the same time as a predetermined time point of start of the reading operation.

This is a case where start of the writing operation comes (i) after start of a vertical sync signal indicative of start of the reading operation and (ii) before start of the reading operation. Also in this case, similarly with the case of (b) of FIG. 3, it is determined that start of the writing operation falls within the risky period, and therefore the operation of the line counter is suspended by the delay period. Also in this case, tearing is prevented. However, a width of the output vertical sync signal or the back porch period is extended by the delay period, causing malfunction of circuits in subsequent stages, particularly an LCD driver circuit (not illustrated) in the LCD 4. As such, variations in VP (width of vertical sync signal) and VB (vertical back porch period) may not be desirable. FIG. 4 illustrates an embodiment in which the effect of the present invention can be enjoyed without varying the VP period and the VB period.

Figure 4:
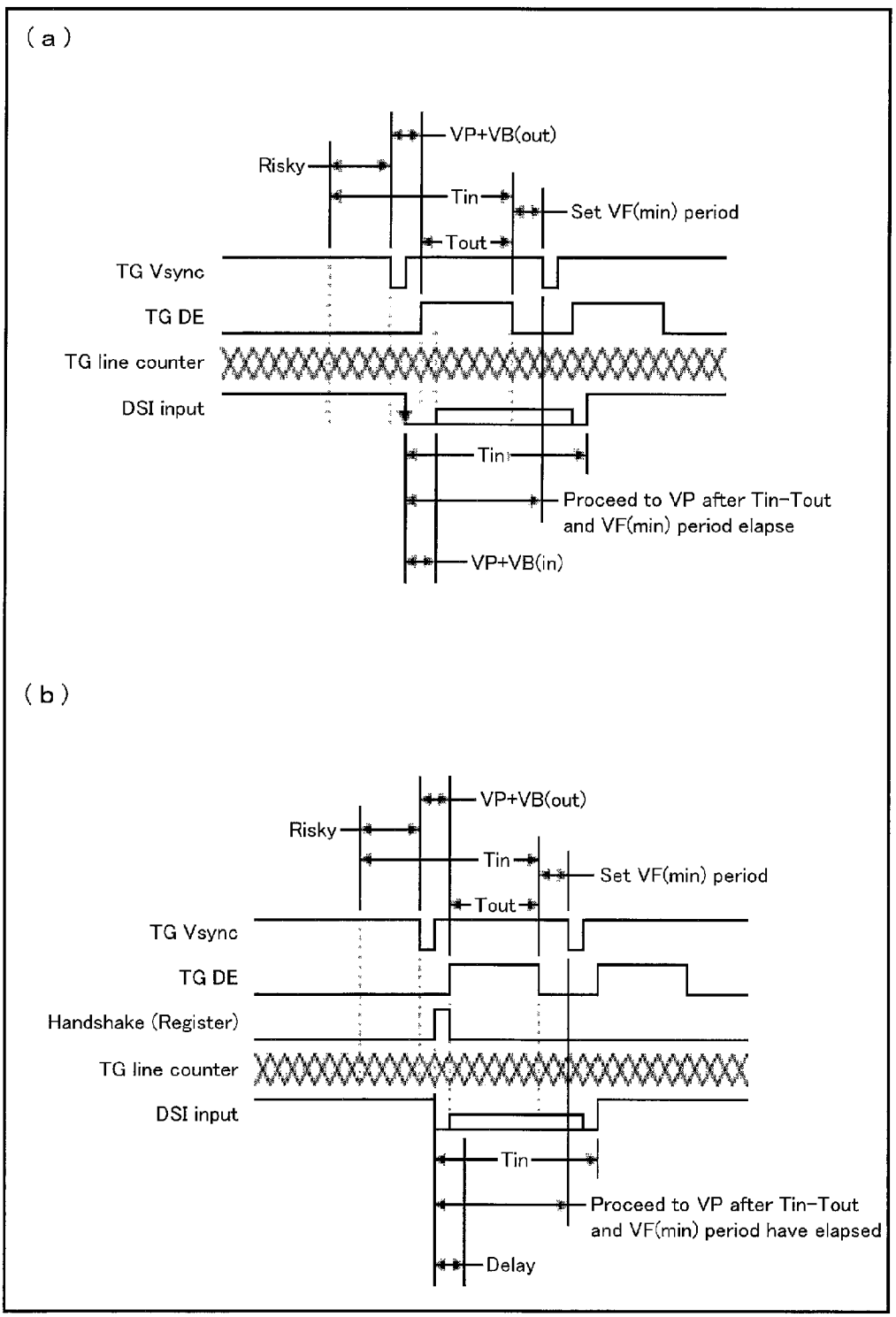
FIG. 4 is a timing chart illustrating examples of the operation of the memory control device. (a) of FIG. 4 illustrates another example of the operation of in a case where transfer of data from the host to the LCD controller is started at substantially the same time as a predetermined time point of start of the reading operation. (b) of FIG. 4 illustrates still another example thereof.

FIG. 4 is a timing chart illustrating other examples of the operation of the image transfer system 1. (a) of FIG. 4 illustrates another example of the operation conducted in a case where data transfer from the host to the LCD controller 3 is started at substantially the same time as a predetermined time point of start of the reading operation. (b) of FIG. 4 illustrates still another example thereof.

First, the "risky period" is set to be a little shorter. Specifically, the "risky period" is set to be a time period from (i) a time point preceding, by the writing period, end of the reading operation to (ii) a time point of start of the vertical sync signal Vsync.

The delay control section 32 delays start of the writing operation so that a time period which is a sum [VP+VB(in)] of the width (VP) of the vertical sync signal and the vertical back porch period (VB) for the writing operation is longer than a time period which is a sum [VP+VB(out)] of the width of the vertical sync signal and the vertical back porch period for the reading operation.

Specifically, in the example illustrated in (a) of FIG. 4, timing is set to meet a relation VP+VB(in)>VP+VB(out), where VP+VB(in) represents a time period from start of DSI input (start of writing operation) to start of image transfer.

On the other hand, in the example illustrated in (b) of FIG. 4, by extending a length of a time period from (i) a time point when the handshake flag to be transmitted from the control register 35 to the host processor 2 is changed to "1" to (ii) a time point when the handshake flag is changed to "0", transfer of image data from the host processor 2 is caused not to start but to wait by the time period VP+VB (out).

This allows avoiding variations in the output vertical back porch period and the vertical sync signal pulse period when preventing tearing.

(Whole Flow of Delay Control)

Figure 11:
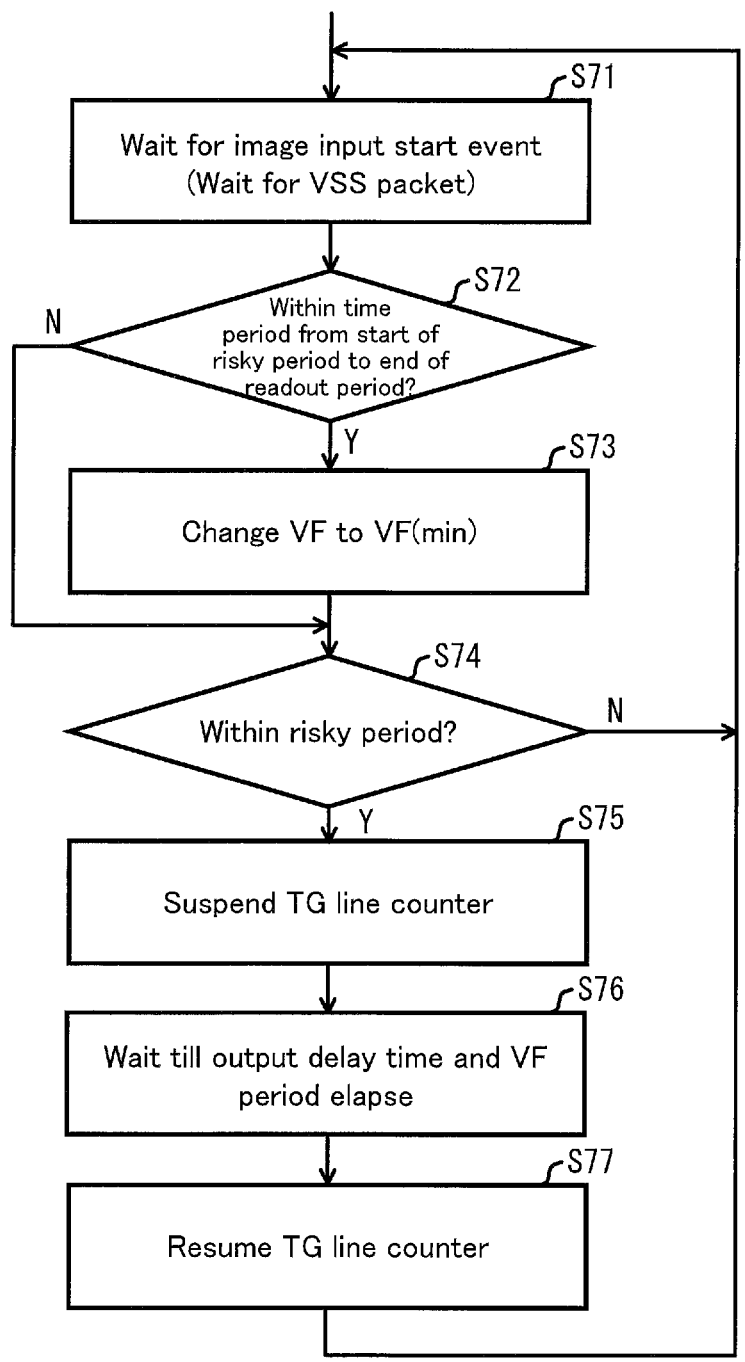
FIG. 11 is a flow chart illustrating an example of a delay control conducted by the LCD controller in the operation of the memory control device.

With reference to FIG. 11, the following description will discuss a whole flow of a delay control carried out by the LCD controller 3 in a case where writing period Tin>readout period Tout. FIG. 11 is a flow chart illustrating an example of a delay control carried out by the LCD controller 3 in the operation of the image transfer system 1.

In the step S71 (hereinafter merely referred to as "S71") in FIG. 11, the LCD controller 3 waits for receiving an occurrence of an image input start event from the host processor 2, and then the process proceeds to S72. The "image input start event" is indicative of, for example, a reception of information which is always transferred before the writing operation of image data. The present embodiment will deal with below a case where the information is a VSS (Vertical Sync Start) packet in a DSI (Display Serial Interface) video mode of an MIPI (Mobile Industry Processor Interface) video mode. However, the present invention is not limited to such a case.

Other examples of "information which is always transferred before the writing operation of data" include (i) a write memory start command in a DCS (Display Command Set) command of an MIPI command mode, (ii) start of a vertical sync signal Vsync in a parallel/LVDS (Low-Voltage Differential Signaling) input, and (iii) a BS (Blanking Start) packet in DP (Display Port).

In S72, the determination section 34 determines whether or not start of the writing operation (a time point indicated by a downward arrow titled DSI input in FIGS. 3 and 4) falls within a time period from start of the risky period to end of the readout period. In a case where it is determined that the start of the writing operation falls within the period from start of the risky period to end of the readout period, the process proceeds to S73 (YES). On the other hand, in a case where it is determined that the start of the writing operation does not fall within the period from start of the risky period to end of the readout period, the process proceeds to S74 (NO).

In S73, the period control section 33 changes the set VF period so that VF(n)=VF(min), and the process proceeds to S74.

In S74, the determination section 34 determines whether or not a time point of start of the writing operation (a time point indicated by the downward arrow titled DSI input in FIGS. 3 and 4) falls within the risky period. In a case where it is determined that the time point of start of the writing operation falls within the risky period, the process proceeds to S75 (YES). On the other hand, in a case where it is determined that the time point of start of the writing operation does not fall within the risky period, the process returns to S71 (NO).

In S75, the delay control section 32 suspends, by the delay period, a line counter for generating a line address used in transferring image data to the LCD controller 3. The process proceeds to S76 in order to delay start of the reading operation as a result of suspension of the line counter.

In S76, the image transfer system 1 waits by the delay period and the set VF period.

After the delay period has elapsed and the set VF period has elapsed, the process proceeds to S77.

In S77, the delay control section 32 releases suspension of the line counter, so that the operation of the line counter is resumed.

(Case where Writing Period Tin<Readout Period Tout)

With reference to FIGS. 5, 6, 8-10, and 12, the following description will discuss how a characteristic operation of the image transfer system 1 is conducted in a case where the writing period Tin<the readout period Tout.

The description will be provided below as to a case where "risky period"=|readout period Tout−writing period Tin|=readout period Tout−writing period Tin. However, the present invention is not limited to such a case. For example, "risky period" may be (readout period Tout−writing period Tin)+(a predetermined margin).

(Flow of Determination on Whether REQ Signal Falls within Risky Period or not and Flow of Delay Control)

Figure 5:
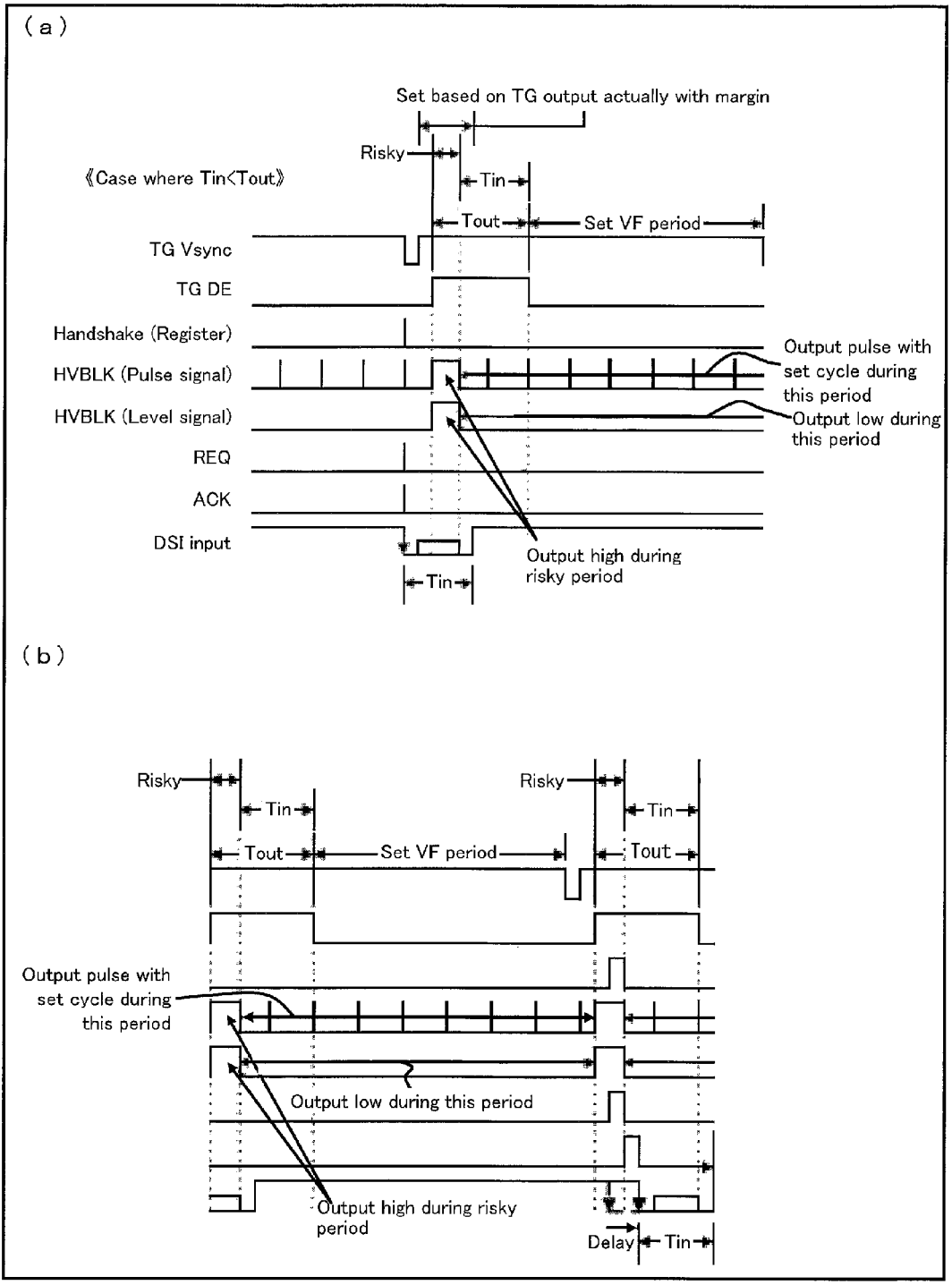
FIG. 5 is a timing chart illustrating examples of the operation of the memory control device. (a) of FIG. 5 illustrates an example of the operation conducted in a case where a time point of a request to start transfer, such as a REQ signal, does not fall within the risky period. On the other hand, (b) of FIG. 5 illustrates an example of the operation conducted in a case where a time point of a request to start transfer, such as a REQ signal, falls within the risky period.

FIG. 5 is a timing chart illustrating examples of the operation of the image transfer system 1.

(a) of FIG. 5 first illustrates an example of the operation conducted in a case where a REQ signal in a High level (REQ=High) does not fall within the risky period. (b) of FIG. 5 illustrates an example of the operation conducted in a case where REQ=High falls within the risky period.

The example illustrated in (b) of FIG. 5 shows an operation conducted in a case where an operation rate of the reading operation<an operation rate of the writing operation (writing period Tin<readout period Tout).

As illustrated in (b) of FIG. 5, in a case where the determination section 34 determines that REQ=High falls within the risky period, transmission and reception of request information and permission information responding to the request information (described later) in a predetermined sequence control between the host processor 2 and the LCD controller 3 in FIG. 1 are delayed until the transmission and reception of the request information and the permission information no longer fall within the risky period, thereby delaying start of the writing operation.

For example, in the example illustrated in (b) of FIG. 5, start of the writing operation is delayed by conducting a control such as (1) extending a time period from a time point when a handshake flag (described later) is changed to "1" to a time point when the handshake flag is changed to "0",
(2) extending a time period from a time point when an HVBLK pulse signal is changed to "High" to a time point when the HVBLK pulse signal is changed to "Low",
(3) extending a time period during which an HVBLK signal is "High", and
(4) extending a time period from a time point when request information REQ=Low→High is transmitted to a time point when permission information ACK=Low→High is transmitted in response.

Consequently, in the case where the operation rate of the reading operation<the operation rate of the writing operation (writing period Tin<readout period Tout), start of the writing operation is delayed during the risky period. This allows start of writing to be avoided in a time period during which tearing is highly likely to occur.

"Predetermined sequence control" is a control in which transfer of data from the host processor 2 to the frame memory 31 is started upon completion of transmission and reception of request information and permission information between the host processor 2 and the LCD controller 3. The request information is indicative of a request to start the writing operation, and the permission information is in response to the request information and indicative of permission to start the writing operation. To be more specific, examples of the predetermined sequence control encompass a sequence control by polling (handshake flag) of the control register 35, a sequence control by a BusTurnAround function (BTA; bus occupancy right) of an MIPI command mode, a sequence control by a REQ (Request) signal/ACK (acknowledge) signal, a sequence control by an HVBLK pulse signal which does not change (is not toggled) in the risky period, a sequence control by an HVBLK level signal which indicates the risky period by its level, and a control in which start of the writing operation from the host processor 2 to the frame buffer 31 is caused to wait with use of a sequence control by an asynchronous bus wait function in a case of an asynchronous bus.

"Polling" is a communication and processing method used in the field of communications and software in order to avoid competition between devices, determine (monitor) a state of preparation of transmission/reception, and synchronize processing. In the polling, an inquiry is made in order and periodically to a plurality of devices and/or a plurality of programs, and when a certain condition is met, transmission/reception and/or processing is made.

Examples of the "request information/permission information" encompass the handshake flag, the bus occupancy right (BTA), the REQ signal/ACK signal, the HVBLK pulse signal, and the HVBLK level signal. These examples of the "request information/permission information" will be detailed below.

(Handshake Flag)

When the host processor 2 transfers image data, the host processor 2 changes a handshake flag of the control register 35 from "0" to "1," and then transmits request information to the LCD controller 3. Upon receipt of the request information, the LCD controller 3 changes, when the host processor 2 is ready to transmit data, the handshake flag of the control register 35 from "1" to "0," and then transmits permission information to the host processor 2. After transmitting the request information, the host processor 2 monitors the handshake flag of the control register 35 by polling. When recognizing reception of the permission information, the host processor 2 starts to transfer image data to the LCD controller 3. It is possible to delay a time point to start a writing operation (time point to start DSI (Display Serial Interface) input), normally by adjusting a time period from a time point when the handshake flag is changed to "1" to a time point when the handshake flag is changed to "0."

Figure 8:
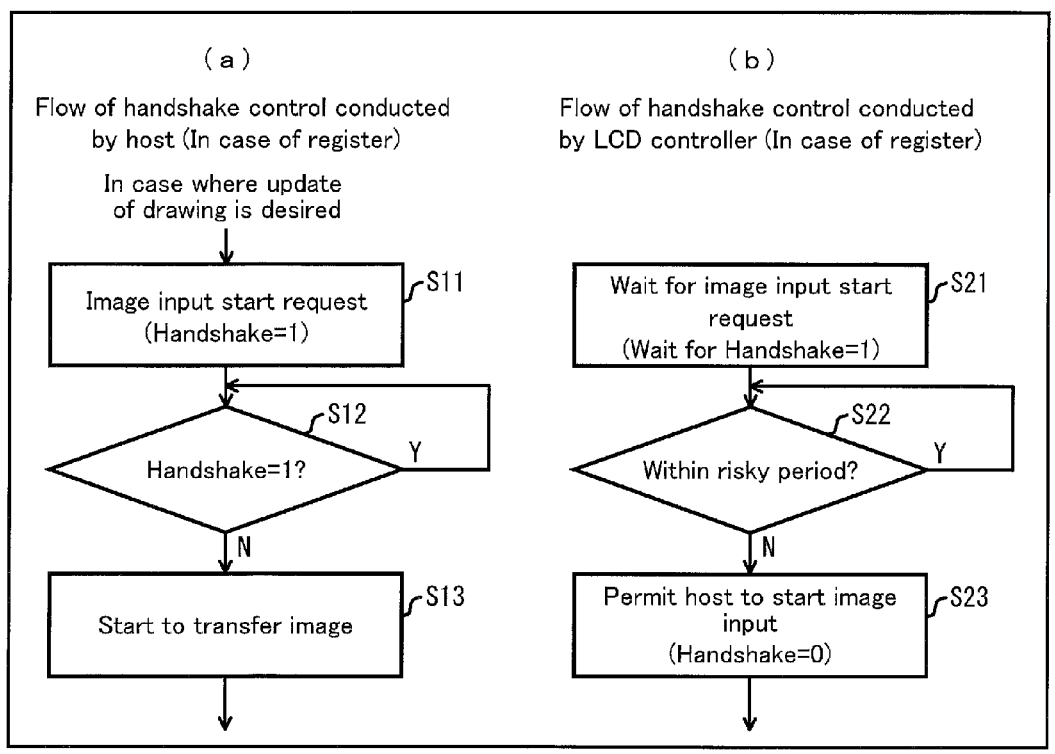
FIG. 8 illustrates flow charts each showing a flow of the operation of the memory control device. (a) of FIG. 8 is a flow chart illustrating an example of a handshake control conducted by a host, and (b) of FIG. 8 is a flow chart illustrating an example of a handshake control conducted by an LCD controller.

(a) of FIG. 8 is a flow chart illustrating an example of a handshake control conducted by the host processor 2 (in a case of the control register 35), and (b) of FIG. 8 is a flow chart illustrating an example of a handshake control conducted by the LCD controller 3 (in the case of the control register 35).

As illustrated in (a) of FIG. 8, in a case where update of image data (update of drawing) is desired, the process proceeds to S11. In S11, the host processor 2 changes the handshake flag from "0" to "1" and transmits request information to the LCD controller 3, and the process proceeds to S12.

In S12, the host processor 2 checks whether the handshake flag is "1" or not. In a case where the handshake flag is "1", the process returns to S12. On the other hand, in a case where the handshake flag is not "1" (the handshake flag is "0"), the process proceeds to S13, and the host processor 2 starts to transfer image data to the LCD controller 3.

Next, as illustrated in (b) of FIG. 8, in S21, the LCD controller 3 waits until receiving request information which requests writing of image data (handshake flag="1"). When the LCD controller 3 receives the request information, the process proceeds to S22.

In S22, the determination section 34 determines whether or not a time point of the writing request falls within the risky period. In a case where the time point of the writing request falls within the risky period, the process returns to S22 (YES). The process remains in S22 during the risky period, and proceeds to S23 after the risky period (NO).

In S23, the control register 35 changes the handshake flag to "0", and permits the host processor 2 to transfer the image data.

(BTA)

In a case of transferring image data, the host processor 2 hands over a bus occupancy right to the LCD controller 3 with use of a BTA function, and transmits request information to the LCD controller 3. Upon receipt of the request information, the LCD controller 3 transmits, when the host processor 2 is ready to transfer data, a TE (Tearing Effect) event to the host processor 2, returns the bus occupancy right to the host processor 2, and transmits permission information. When recognizing reception of the permission information, the host processor 2 starts to transfer the data to the LCD controller 3.

Figure 9:
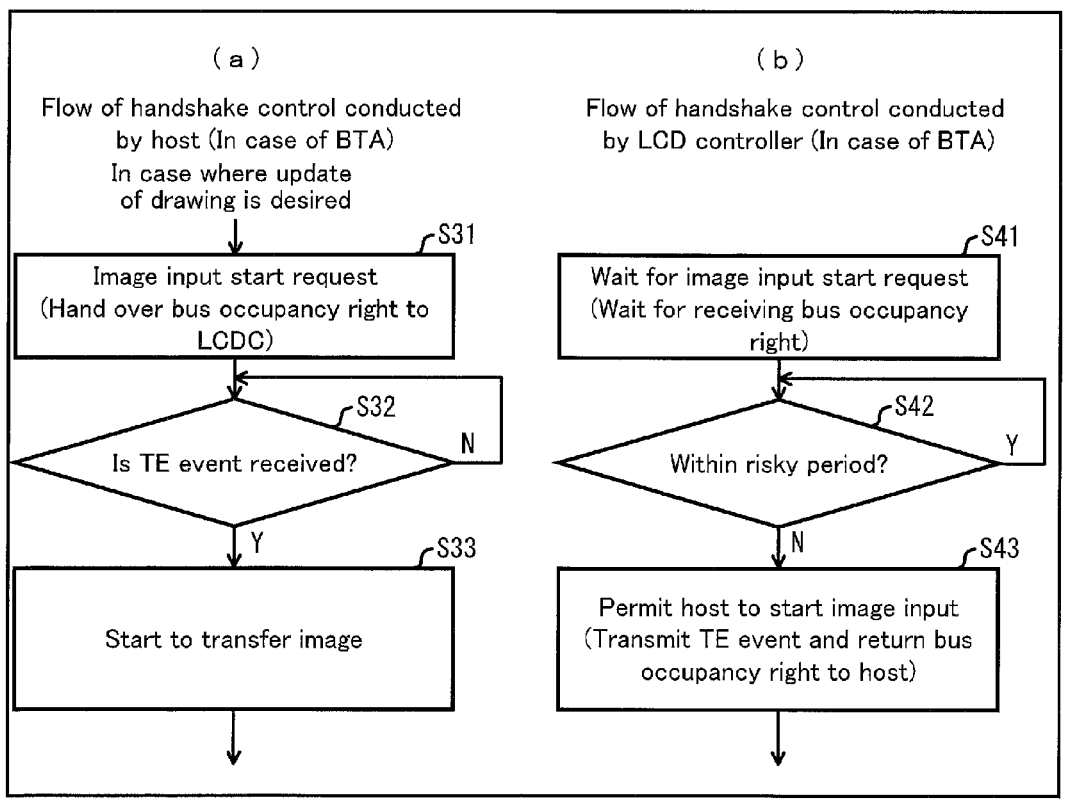
FIG. 9 illustrates flow charts each showing a flow of the operation of the memory control device. (a) of FIG. 8 is a flow chart illustrating another example of a handshake control conducted by the host, and (b) of FIG. 8 is a flow chart illustrating another example of a handshake control conducted by the LCD controller.

(a) of FIG. 9 is a flow chart illustrating an example of a handshake control conducted the host processor 2 (in a case of BTA), and (b) of FIG. 9 is a flow chart illustrating an example of a handshake control conducted by the LCD controller 3 (in the case of BTA).

As illustrated in (a) of FIG. 9, in a case where update of image data (update of drawing) is desired, the process proceeds to S31. In S31, the host processor 2 hands over the bus occupancy right to the LCD controller 3, and the process proceeds to S32.

In S32, the host processor 2 checks whether or not the host processor 2 has received the TE event from the LCD controller 3. In a case where the host processor 2 has received the TE event from the LCD controller 3, the process proceeds to S33 (YES). On the other hand, in a case where the host processor 2 has not received the TE event from the LCD controller 3, the process returns to S32.

In S33, the host processor 2 starts to transfer image data to the LCD controller 3.

Next, as illustrated in (b) of FIG. 9, in S41, the LCD controller 3 waits until receiving the bus occupancy right from the host processor 2, and the process proceeds to S42.

In S42, the determination section 34 determines whether or not a time point of the writing request falls within the risky period. In a case where the time point of the writing request falls within the risky period, the process returns to S42 (YES). The process remains in S42 during the risky period, and proceeds to S43 after the risky period (NO).

In S43, the LCD controller 3 transmits the TE event to the host processor 2, and returns the bus occupancy right to the host processor 2.

(REQ Signal/ACK Signal)

Figure 10:
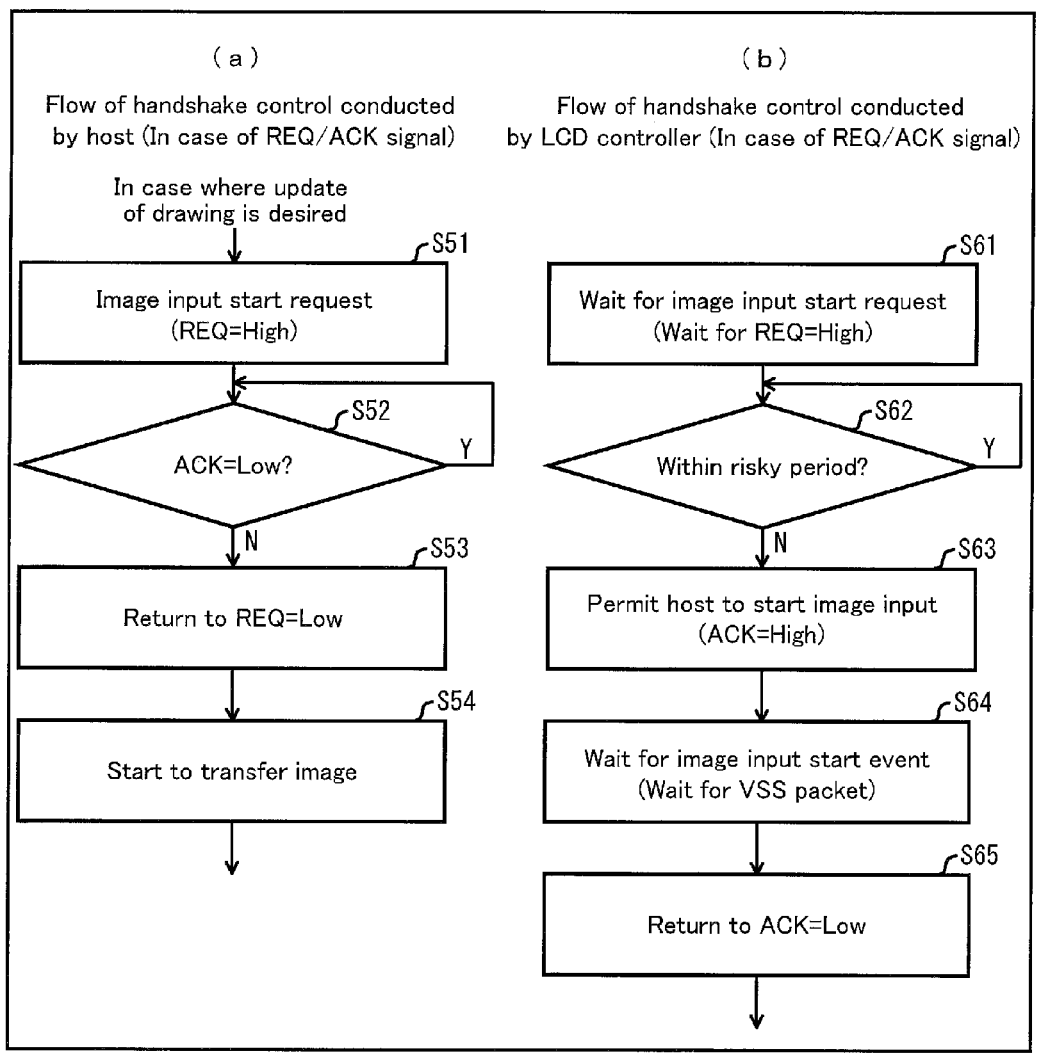
FIG. 10 illustrates flow charts each showing a flow of the operation of the memory control device. (a) of FIG. 8 is a flow chart illustrating still another example of a handshake control conducted by the host, and (b) of FIG. 8 is a flow chart illustrating still another example of a handshake control conducted by the LCD controller.

Next, with reference to FIG. 10, the following description will discuss a flow of a handshake control with use of a REQ signal/ACK signal.

(a) of FIG. 10 is a flow chart illustrating an example of a handshake control conducted by the host processor 2 (in a case of the REQ signal/ACK signal), and (b) of FIG. 10 is a flow chart illustrating an example of a handshake control conducted by the LCD controller 3 (in the case of the REQ signal/ACK signal).

As illustrated in (a) of FIG. 10, in a case where update of image data (update of drawing) is desired, the process proceeds to S51. In S51, the host processor 2 transmits, to the LCD controller 3, the REQ signal in a High level (REQ=High), and the process proceeds to S52.

In S52, the host processor 2 checks whether or not the ACK signal from the LCD controller 3 is in a Low level (ACK=Low). In a case where ACK=Low, the process returns to S52 (YES). On the other hand, in a case where ACK≠Low (i.e. ACK=High), the process proceeds to S53 (NO).

In S53, the host processor 2 changes the REQ signal to REQ=Low, and the process proceeds to S54.

In S54, the host processor 2 starts to transfer an image to the LCD controller 3.

Next, as illustrated in (b) of FIG. 10, the LCD controller 3 waits until receiving REQ=High from the host processor 2, and the process proceeds to S62.

In S62, when the LCD controller 3 receives REQ=High from the host processor 2, the determination section 34 determines whether or not a time point of a writing request falls within the risky period. In a case where the time point of the writing request falls within the risky period, the process proceeds to S62 (YES). The process remains in S62 during the risky period, and proceeds to S63 after the risky period (NO).

In S63, the LCD controller 3 transmits the ACK signal in High level (ACK=High) to the host processor 2, and the process proceeds to S64.

In S64, the LCD controller 3 waits for transmission of a VSS packet from the host processor 2, and the process proceeds to S65.

In S65, the LCD controller 3 changes the ACK signal to Low level (ACK=Low).

(HVBLK Pulse Signal)

The LCD controller 3 outputs, at a predetermined cycle, a single HVBLK pulse signal which rises to High and falls to Low in an extremely short period. The LCD controller 3 maintains the HVBLK pulse signal in a High level during the risky period, and restores the HVBLK pulse signal to a Low level after the risky period. The host processor 2 waits for an edge (falling edge) of the HVBLK pulse signal and confirms the level of the HVBLK pulse signal, and when confirming that the HVBLK pulse signal is at an edge (in a Low level), the host processor 2 starts to transfer image data.

(HVBLK Level Signal)

The LCD controller 3 maintains an HVBLK level signal in a High state during the risky period, and outputs the HVBLK level signal in a Low state in other period. The host processor 2 performs polling of (monitors) the HVBLK level signal, and when the HVBLK level signal is in a Low level, the host processor 2 starts to transfer image data.

(Flow of Case where Start of Writing Operation Falls within Time Period from End of Risky Period to End of Reading Operation)

Figure 6:
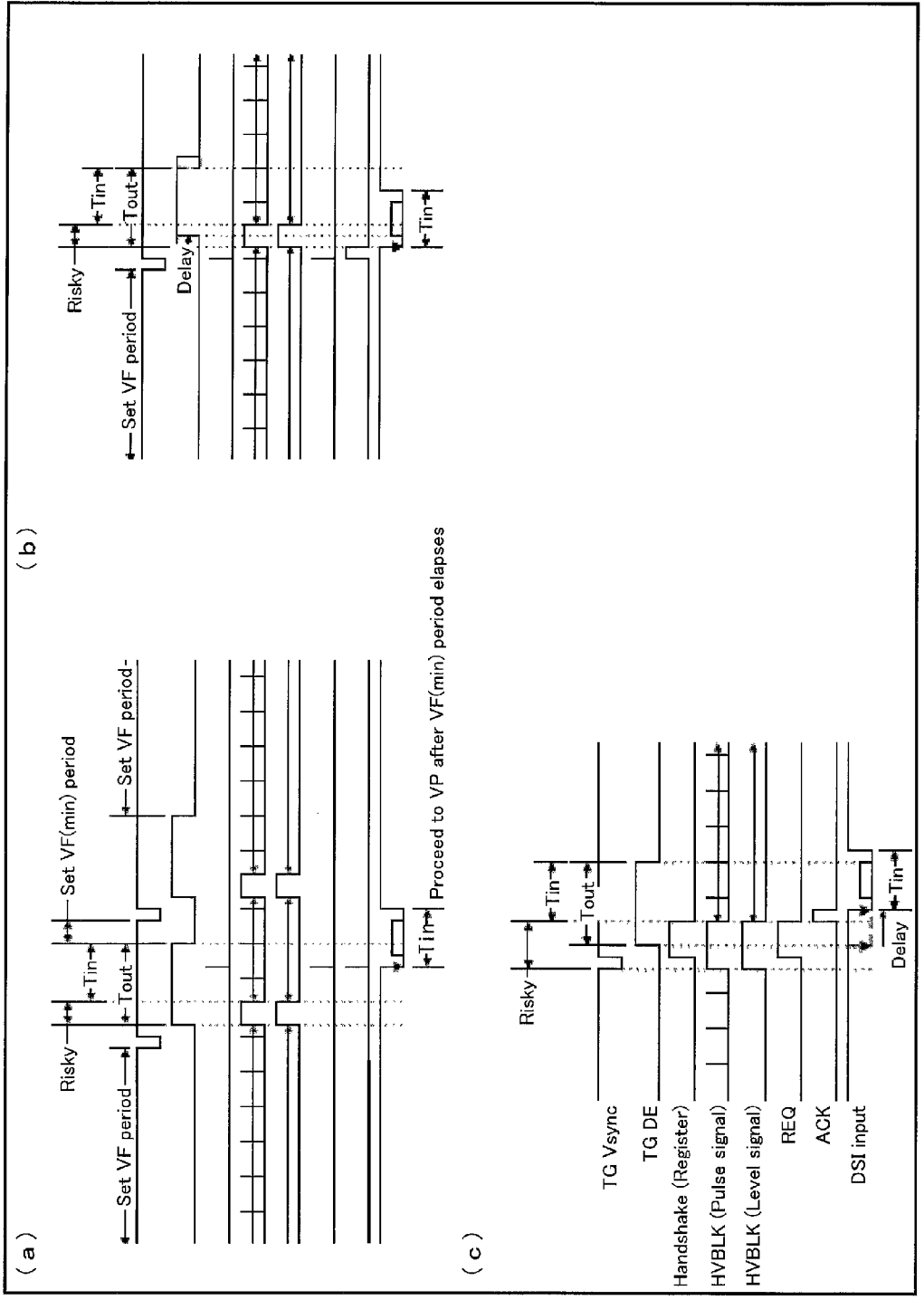
FIG. 6 is a timing chart illustrating examples of the operation of the memory control device. (a) of FIG. 6 illustrates an example of the operation conducted in a case where a time point of request to start transfer, such as a REQ signal, falls within a time period from end of the risky period to end of the reading operation. (b) of FIG. 6 illustrates an example of the operation conducted in a case where a time point of a request to start transfer, such as a REQ signal, is immediately before a predetermined time point of start of the reading operation. (c) of FIG. 6 illustrates another example thereof.

Next, (a) of FIG. 6 illustrates an example of an operation conducted in a case where start of the writing operation falls within a time period from end of the risky period to end of the reading operation.

In a case where the determination section 34 determines that start of the writing operation falls within a time period from end of the risky period to end of the reading operation of image data in a previous frame, the period control section 33 illustrated in FIG. 1 shortens a length of a front porch period (set VF period), thereby advancing start of the reading operation of image data. In the present embodiment, the set VF period is set to the minimum value VF(min). This allows written image data to be outputted after a shortest time possible.

On the other hand, in a case where the determination section 34 does not determine that start of the writing operation falls within a time period from end of the risky period to end of the reading operation of image data in a previous frame, the period control section 33 illustrated in FIG. 1 causes the length of the front porch period to be equal to or longer than the length of a front porch period of the previous frame. This allows power consumption to be automatically reduced in a case where no data is written.

(Flow of Case where REQ Signal is Transmitted at Substantially the Same Time as Predetermined Time Point of Start of Reading)

Next, (b) of FIG. 6 illustrates another example of the operation of the image transfer system 1. (b) of FIG. 6 illustrates an example of the operation conducted in a case where REQ=High is transmitted from the host processor 2 to the LCD controller 3 immediately before a predetermined time point of start of the reading operation, and (c) of FIG. 6 illustrates still another example thereof.

(b) of FIG. 6 illustrates a case where start of the writing operation comes after start of a vertical sync signal indicative of start of the reading operation and before start of the reading operation. Also in this case, similarly with the case of (a) of FIG. 5, it is determined that a time point of requesting start of the writing operation does not fall within the risky period, and therefore the host processor 2 receives permission information immediately. Thereafter, the host processor 2 starts transfer of an image. In a case where predetermined timing to start the reading operation comes before transfer of the image is started, the line counter is suspended and the LCD controller 3 waits for the host processor 2 to start transfer of the image. When the host processor 2 starts to transfer data, the LCD controller 3 resumes a line counter operation, and starts the reading operation. Also in this case, tearing is prevented. However, a width of the output vertical sync signal or the back porch period is prolonged by the delay period, causing a malfunction of circuits in subsequent stages, particularly an LCD driver circuit in the LCD 4. As such, variations in VP (width of vertical sync signal) and VB (vertical back porch period) may not be desirable. (c) of FIG. 6 illustrates an embodiment in which the effect of the present invention can be enjoyed without varying the VP period and the VB period.

Firstly, the "risky period" is set to be a little longer. Specifically, the "risky period" is set to be a time period from (i) a time point of start of the vertical sync signal Vsync to (ii) a time point preceding end of the reading operation by a length of the writing period.

The delay control section 32 delays start of the writing operation by the risky period.

Specifically, in the example illustrated in (c) of FIG. 6, start of the writing operation is delayed by conducting a control such as (1) extending a time period from a time point when a handshake flag (described later) is changed to "1" to a time point when the handshake flag is changed to "0", (2) extending a time period from a time point when an HVBLK pulse signal is changed to "High" to a time point when the HVBLK pulse signal is changed to "Low", (3) extending a time period during which an HVBLK signal is "High", and (4) extending a time period from a time point when request information REQ=Low→High is transmitted to a time point when permission information ACK=Low→High is transmitted in response.

Consequently, while tearing is prevented, it is possible to avoid variations in an output vertical back porch period and an output vertical sync signal pulse period.

(Whole Flow of Delay Control)

Figure 12:
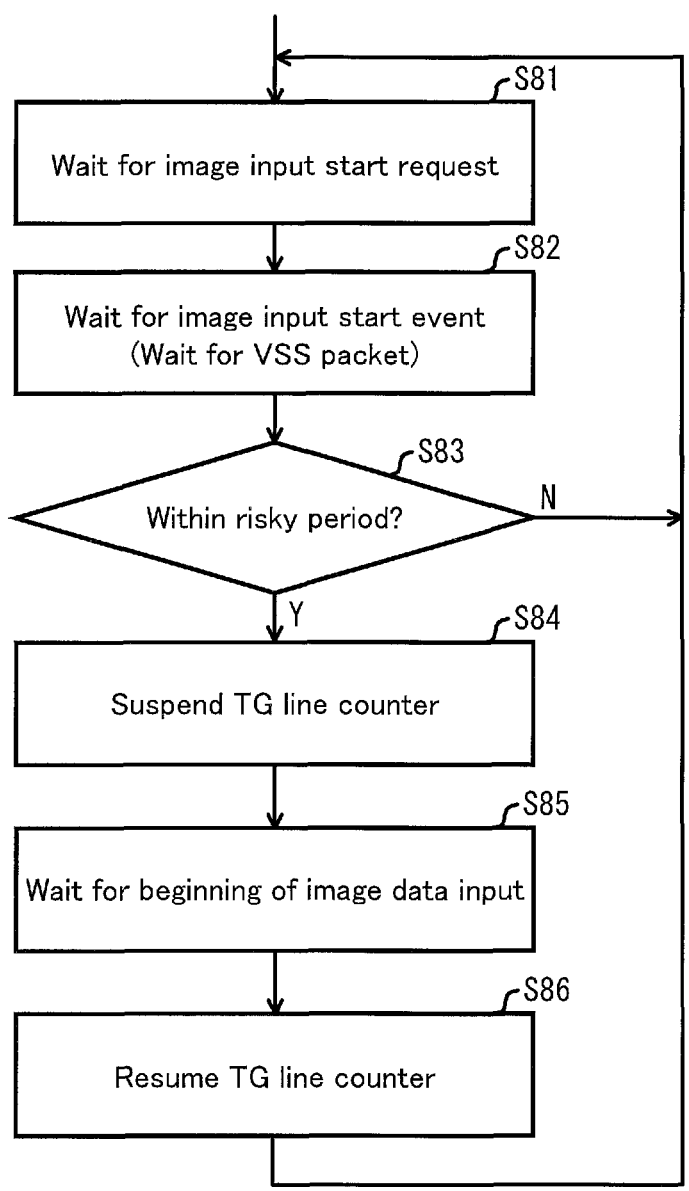
FIG. 12 is a flow chart illustrating another example of a delay control conducted by the LCD controller in the operation of the memory control device.

With reference to FIG. 12, the following description will discuss a whole flow of a delay control conducted by the LCD controller 3 in a case where writing period Tin<readout period Tout. FIG. 12 is a flow chart illustrating an example of a delay control conducted by the LCD controller 3 in the operation of the image transfer system 1.

In S81 in FIG. 12, the LCD controller 3 waits for an image input start request from the host processor 2, and waits until the current time no longer falls within the risky period and then returns permission information to the host processor 2, and the process proceeds to S82. In S82, the LCD controller 3 waits for an image input start event (e.g. transmission/reception of information always transferred before the writing operation of image data), and then the process proceeds to S83. In the present embodiment, a description will be provided below as to a case where the information is a VSS packet in a DSI video mode of an MIPI video mode. However, the present invention is not limited to this case.

In S83, the determination section 34 determines whether or not start of the writing operation (time point indicated by a downward arrow titled DSI input in (a) and (b) of FIG. 5) falls within the risky period. In a case where the start of the writing operation falls within the risky period, the process proceeds to S84 (YES). On the other hand, in a case where the start of the writing operation does not fall within the risky period, the process returns to S81 (NO).

In S84, the delay control section 32 suspends a line counter for generating a line address used in transferring image data to the LCD controller 3. This delays start of the reading operation, and the process proceeds to S85.

The process remains in S85 until the determination section 34 checks a time point of the beginning of image data input, and the process proceeds to S86.

In S86, the delay control section 32 releases suspension of the line counter, so that the operation of the line counter is resumed, and the process returns to S81.

As described above, also in the case where the writing period Tin<the readout period Tout, the delay control may be conducted by the handshake control and suspension of the line counter. In this case, tearing is prevented, but extension of the width of the output vertical sync signal or the back porch period by the delay period occurs, which is not desirable. However, by setting the risky period to be so long as to include the VP period and the VB period, it is possible to prevent tearing without variations in the VP period and the VB period.

(Effect of Image Transfer System 1)

With the image transfer system 1, in a case where the operation rate of the reading operation>the operation rate of the writing operation, start of the reading operation is delayed by a predetermined delay period which is determined in advance based on a time period corresponding to a difference between the operation rate of the reading operation and the operation rate of the writing operation (=difference between readout period and writing period). On the other hand, in a case where the operation rate of the reading operation<the operation rate of the writing operation, start of the writing operation is delayed by a predetermined delay period which is determined in advance based on a time period substantially corresponding to a difference between the operation rate of the reading operation and the operation rate of the writing operation. Consequently, start of the writing operation or start of the reading operation in a time period during which tearing is highly likely to occur is avoided. Since it is possible to avoid tearing without having an idle time outside the risky period, it is unnecessary for the host processor 2 to wait to transfer image data until safe timing comes every time when the host processor 2 updates image data. Accordingly, the host processor 2 is not required to have a wasteful idle time as in the conventional art.

Furthermore, since the host processor 2 is not required to have a wasteful idle time, drop frame does not occur unlike the conventional art, and wasteful power consumption such as one when the host processor 2 is in an idle time is not made unlike the conventional art.

As above, with the present invention, it is possible to avoid drop frame and reduce wasteful power consumption such as one when the host processor 2 is in an idle time.

Furthermore, the present invention brings about a secondary effect that since display is made without an idle time just at a time when the host processor 2 intends to make display, temporal variation between frames of a motion image does not appear, and consequently a motion judder phenomenon does not occur.

[Mobile Terminal 10]

Figure 2:
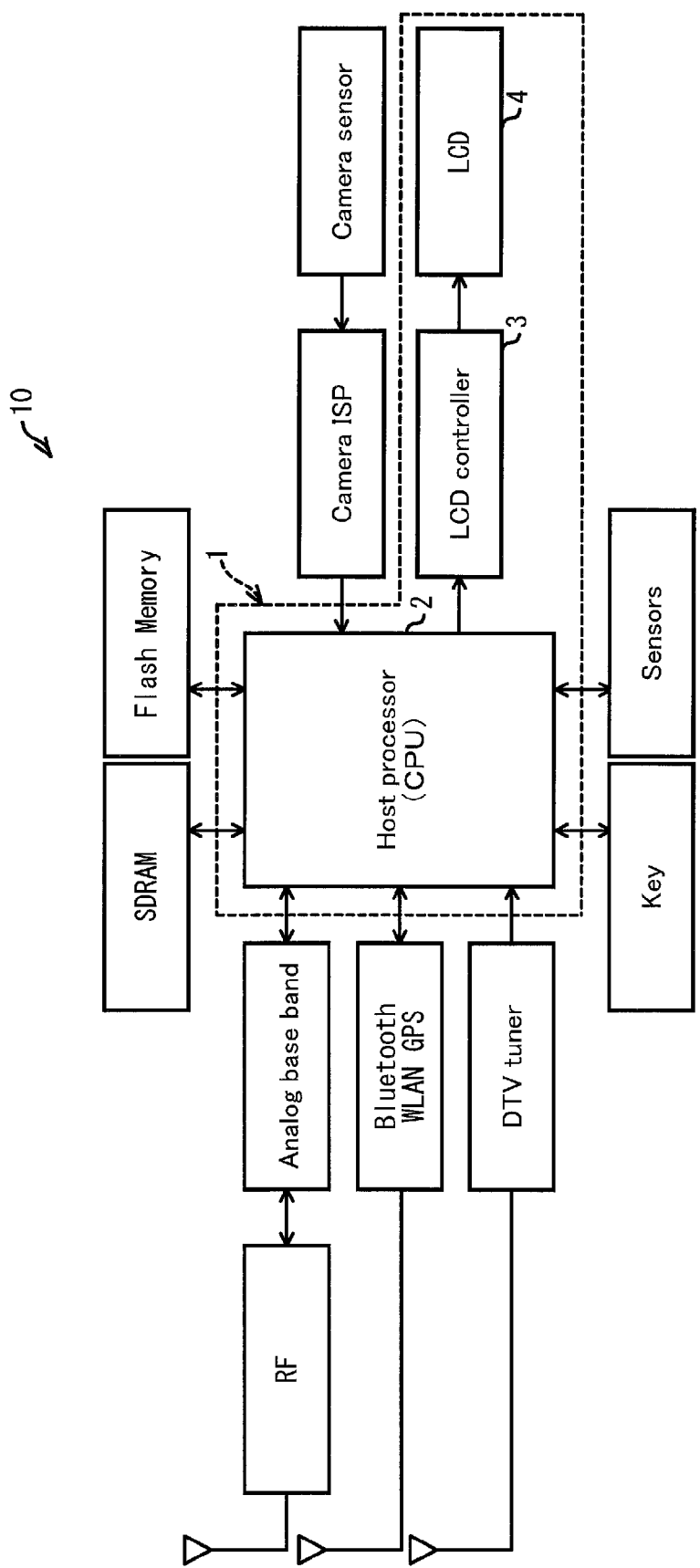
FIG. 2 is a block diagram illustrating an embodiment of a mobile terminal of the present invention (including the memory control device).

Next, with reference to FIG. 2, a description will be discussed below as to the mobile terminal 10 which is another embodiment of the present invention. FIG. 2 is a block diagram illustrating a whole configuration of the mobile terminal 10 including the image transfer system 1.

As illustrated in FIG. 2, the mobile terminal 10 includes, in addition to the image transfer system 1, an SDRAM, a flash memory, a camera sensor, a camera ISP, RF, an analog base band, Bluetooth©, WLAN, GPS (Global Positioning System), a DTV tuner, keys, sensors etc. Note, however, that components, other than the image transfer system 1, are not closely related to an essence of the present invention and so their descriptions are omitted here.

(Effect of Mobile Terminal 10)

Since the mobile terminal 10 in accordance with the present embodiment includes the image transfer system 1, it is possible to realize a mobile terminal capable of avoiding frame from being dropped and reducing wasteful power consumption such as power consumed in a waiting time of the host processor 2.

[Software Implementation Example]

Lastly, blocks of the image transfer system 1, blocks of the LCD controller 3 in particular, may be realized by a logic circuit (hardware) provided in an integrated circuit (IC chip) or may be realized by software as executed by a CPU (Central Processing Unit).

In the latter case, the image transfer system 1 includes: a CPU that executes instructions of a program that is software realizing the foregoing functions (e.g. memory control program); ROM (Read Only Memory) that stores the program; RAM (Random Access Memory) that develops the program; and a storage device (storage medium) storing the program and various kinds of data. The object of the present invention can be realized in such a manner that the image transfer system 1 is provided with a computer-readable storage medium for storing program codes (such as executable program, intermediate code program, and source program) of programs of the image transfer system 1 which programs serve as software for realizing the functions, and a computer (alternatively, CPU or MPU) reads out and executes the program codes stored in the storage medium.

The storage medium is a non-transitory tangible medium which is, for example, tapes such as a magnetic tape and a cassette tape, or discs such as magnetic discs (e.g. a floppy Disc® and a hard disc), and optical discs (e.g. CD-ROM, MO, MD, DVD, and CD-R), or cards such as an IC card (including a memory card) and an optical card, or semiconductor memories such as mask ROM, EPROM, EEPROM®, and flash ROM, or logic circuits such as PLD (Programmable logic device) and FPGA (Field Programmable Gate Array).

Further, the image transfer system 1 may be arranged so as to be connectable to a communication network so that the program code is supplied to the image transfer system 1 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL (Asymmetric Digital Subscriber Line) and (ii) wireless connections such as IrDA and remote control using infrared ray, Bluetooth®, IEEE 802.11, HDR (High Data Rate), NFC (Near Field Communication), DLNA (Digital Living Network Alliance)®, mobile phone network, satellite connections, and terrestrial digital network. Note that the present invention can be also realized by the program codes in the form of a computer data signal embedded in a carrier wave, which is the program that is electrically transmitted.

[Summary]

A memory control device in accordance with first aspect of the present invention is a memory control device which conducts (i) a writing operation in which data transferred from a host is written in a frame memory and (ii) a reading operation in which the data is read out from the frame memory so as to transfer the data to a display control section, the memory control device comprising: a determination section for determining, in a case where a readout period from start of the reading operation to end of the reading operation is different in length from a writing period from start of the writing operation to end of the writing operation, whether start of the writing operation falls within a risky period which is predetermined based at least on a difference between the readout period and the writing period; and a delay section for delaying, in a case where the determination section determines that the start of the writing operation falls within the risky period, the start of one of the reading operation and the writing operation which one is higher in operation rate, said one of the reading operation and the writing operation being delayed by a predetermined delay period which is predetermined based on a difference between the readout period and the writing period.

With the arrangement, in the case where the readout period is different in length from the writing period, the determination section determines whether the start of the writing operation falls within the predetermined risky period. The delay section delays, in the case where the determination section determines that the start of the writing operation falls within the risky period, the start of one of the reading operation and the writing operation which one is higher in operation rate, said one of the reading operation and the writing operation being delayed by the predetermined delay period which is predetermined based on the difference between the readout period and the writing period.

Consequently, in the case where the reading operation is higher in operation rate than the writing operation, start of the reading operation is delayed by the predetermined delay period which is predetermined based on a time period corresponding to the difference between the readout period and the writing period. On the other hand, in the case where the reading operation is lower in operation rate than the writing operation, start of the writing operation is delayed by the predetermined delay period which is predetermined based on a time period substantially corresponding to the difference in operation rate between the reading operation and the writing operation. Accordingly, start of the writing operation or the reading operation during a time period in which tearing is highly likely to occur is avoided. Since it is possible to avoid tearing without having a wasteful idle time outside the risky period, it is unnecessary for the host to wait to transfer data until safe timing comes every time when the host updates data. Accordingly, the host is not required to have a wasteful idle time as in the conventional art.

Furthermore, since the host is not required to have an idle time, drop frame does not occur unlike the conventional art, and wasteful power consumption such as one when the host is in an idle time is not made unlike the conventional art.

As above, with the present invention, it is possible to avoid drop frame and reduce wasteful power consumption such as one when the host is in an idle time.

Furthermore, the present invention brings about a secondary effect that since display is made without an idle time just at a time when the host intends to make display, temporal variation between frames of a motion image does not appear, and therefore a motion judder phenomenon does not occur.

"Risky period" is a time period predetermined based on at least a difference between the readout period and the writing period, with use of, as a reference, a time point where the reading operation ends. Note that the term "at least" is used in consideration of a case where the risky period=(difference between readout period and writing period)+(predetermined margin).

"Delay period" indicates a time period predetermined based on the difference between the readout period and the writing period. It is preferable that the "delay period" is equal to or longer than the difference between the readout period and the writing period. For example, the "delay period" may be set such that "delay period"="difference between the readout period and the writing period) or "delay period"="difference between the readout period and the writing period)+(predetermined margin).

A memory control device in accordance with second aspect of the present invention may be an arrangement of the first aspect, wherein in a case where the reading operation is higher in operation rate than the writing operation, the risky period is set as a time period from (i) a time point preceding the end of the reading operation by a length of the writing period to (ii) the start of the reading operation, and the delay section delays, in a case where it is determined that the start of the writing operation falls within the risky period, the start of the reading operation by suspending, by the delay period, a line counter for generating a line address used in transferring the data to the display control section.

With the arrangement, in the case where the reading operation is higher in operation rate than the writing operation and it is determined that the start of the writing operation falls within the risky period, the line counter is suspended by the delay period. This delays the start of the reading operation.

Consequently, in the case where the reading operation is higher in operation rate than the writing operation, the start of the reading operation is delayed by a predetermined delay period including at least the period substantially corresponding to the difference in operation rate between the reading operation and the writing operation. This allows start of reading to be avoided during a time period in which tearing is highly likely to occur.

A memory control device in accordance with third aspect of the present invention may be an arrangement of the first aspect, wherein in a case where the writing operation is higher in operation rate than the reading operation, the risky period is set as a time period from (i) the start of the reading operation to (ii) a time point preceding the end of the reading operation by a length of the writing period, and the delay section delays, in a case where it is determined that the start of the writing operation falls within the risky period, the start of the writing operation by delaying transmission and reception of permission information in response to request information in a sequence control until the start of the writing operation no longer falls within the risky period, the sequence control being a control in which transfer of the data from the host to the frame memory is started upon completion of transmission and reception of the request information and the permission information between the host and the display control section, the request information being indicative of a request to start the writing operation, the permission information being in response to the request information and indicative of permission to start the writing operation.

With the arrangement, in the case where the reading operation is lower in operation rate than the writing operation and it is determined that the start of the writing operation falls within the risky period, at least one of (i) transmission and reception of the request information and (ii) transmission and reception of the permission information is delayed in a predetermined sequence control between the host and the display control section until the start of the writing operation no longer falls within the risky period, the start of the writing operation is delayed.

Consequently, in the case where the reading operation is lower in operation rate than the writing operation, the start of the writing operation is delayed until the start of the writing operation no longer falls within the risky period. This allows start of reading to be avoided during a time period in which tearing is highly likely to occur.

The "predetermined sequence control" is a control in which transfer of the data from the host to the frame memory is started upon completion of transmission and reception of request information and permission information between the host and the display control section, the request information being indicative of a request to start the writing operation, the permission information being in response to the request information and indicative of permission to start the writing operation. To be more specific, examples of the "predetermined sequence control" encompass a sequence control by polling (handshake flag) of a control register, a sequence control by BTA (BusTurnAround function; bus occupancy right) of an MIPI (Mobile Industry Processor Interface) command mode, a sequence control by a REQ (Request) signal/ACK (acknowledge) signal, a sequence control by a pulse signal which does not change (is not toggled) in the risky period, a sequence control by a level signal which indicates the risky period by its level, and a control in which start of the writing operation from a host to a frame buffer is caused to wait with use of a sequence control by an asynchronous bus wait function in a case of an asynchronous bus.

"Polling" is a communication and processing method used in the field of communications and software in order to avoid competition between devices, determine a state of preparation of transmission/reception, and synchronize processing. In the polling, an inquiry is made in order and periodically to a plurality of devices and/or a plurality of programs, and when a certain condition is met, transmission/reception and/or processing is made.

Examples of the "request information/permission information" encompass a handshake flag, a bus occupancy right (BTA), a REQ signal/ACK signal, a pulse signal, and a level signal.

A memory control device in accordance with fourth aspect of the present invention may be an arrangement of the third aspect, wherein the determination section further determines whether the start of the reading operation falls within a time period from (i) the transmission and reception of the permission information in response to the request information between the host and the display control section to (ii) start of transfer of the data from the host to the frame memory, and in a case where the determination section determines that the start of the reading operation falls within a time period from (i) a time point of completion of the transmission and reception of the permission information in response to the request information between the host and the display control section to (ii) the start of transfer of the data from the host to the frame memory, the delay section suspends a line counter for generating a line address used in transferring the data to the display control section.

With the arrangement, in a case where it is determined that the start of the reading operation falls within a time period from (i) a time point of completion of the transmission and reception of the permission information in response to the request information to (ii) the start of transfer of the data, the line counter is suspended until transfer of the data starts. Consequently, it is possible to avoid reading of data from being started before writing of the data is started.

A memory control device in accordance with fifth aspect of the present invention may be an arrangement of the second aspect, wherein when the determination section receives, during the risky period, information which is always transferred before the writing operation of the data, the determination section determines that the start of the writing operation of the data falls within the risky period.

With the arrangement, it is possible to avoid writing of data from being started before reading of the data is started.

Specific examples of "information which is always transferred before the writing operation of data" include a VSS (Vertical Sync Start) packet in a DSI (Display Serial Interface) video mode of an MIPI video mode, a write memory start command in a DCS (Display Command Set) command of an MIPI command mode, start of a vertical sync signal Vsync in a parallel/LVDS (Low-Voltage Differential Signaling) input, and a BS (Blanking Start) packet in DP (Display Port).

A memory control device in accordance with sixth aspect of the present invention may be an arrangement of any one of the first through fifth aspects, further comprising a time period adjusting section for adjusting a length of a front porch period of each frame period in the reading operation of the data, the determination section determining whether or not the start of the writing operation falls within a time period from end of the risky period to end of the reading operation of data in a previous frame, in a case where the determination section determines that the start of the writing operation falls within the period from the end of the risky period to the end of the reading operation of the data in a previous frame, the period adjusting section advancing the start of the reading operation of the data by causing the length of the front porch period to be equal to or shorter than a length of a front porch period in the previous frame, and in a case where the determination section does not determine that the start of the writing operation falls within the period from the end of the risky period to the end of the reading operation of data in the frame previous to the data, the period adjusting section causing the length of the front porch period to be equal to or longer than the length of the front porch period in the previous frame.

With the arrangement, the determination section determines whether or not the start of the writing operation falls within a time period from end of the risky period to end of the reading operation of data in a previous frame. In a case where the determination section determines that the start of the writing operation falls within the period from the end of the risky period to the end of the reading operation of the data in a previous frame, the period adjusting section advances the start of the reading operation of the data by causing the length of the front porch period to be equal to or shorter than a length of a front porch period in the previous frame. On the other hand, in a case where the determination section does not determine that the start of the writing operation falls within the period from the end of the risky period to the end of the reading operation of the data in a previous frame, the period adjusting section causes the length of the front porch period to be equal to or longer than the length of the front porch period in the previous frame. Consequently, it is possible to output the written data after a shortest time possible, and in a case where no data is written, it is possible to automatically reduce power consumption.

A memory control device in accordance with seventh aspect of the present invention may be an arrangement of any one of the first through sixth aspects, wherein the determination section determines whether or not the start of the writing operation falls within a time period from end of the risky period to the end of the reading operation, and in a case where the determination section determines that the start of the writing operation falls within the period from the end of the risky period to the end of the reading operation, the delay section delays the start of the reading operation by the delay period.

With the arrangement, the determination section determines whether or not the start of the writing operation falls within a time period from end of the risky period to the end of the reading operation. In the case where the determination section determines that the start of the writing operation falls within the period from the end of the risky period to the end of the reading operation, the delay section delays the start of the reading operation by the delay period.

Consequently, it is possible to avoid reading of data from being completed before writing of the data is completed.

A memory control device in accordance with eighth aspect of the present invention may be an arrangement of the second aspect, wherein in the case where the reading operation is higher in operation rate than the writing operation, the risky period is set as a time period from (i) a time point preceding the end of the reading operation by a length of the writing period to (ii) start of a vertical sync signal, and the delay section delays the start of the writing operation so that a time period which is a sum of a vertical front porch period and a vertical sync signal pulse period for the writing operation is longer than a time period which is a sum of a vertical front porch period and a vertical sync signal pulse period for the reading operation.

With the arrangement, the risky period is set as a time period from (i) a time point preceding the end of the reading operation by a length of the writing period to (ii) start of a vertical sync signal. The delay section delays the start of the writing operation so that a time period which is a sum of a vertical back porch period and a vertical sync signal pulse period for the writing operation is longer than a time period which is a sum of a vertical back porch period and a vertical sync signal pulse period for the reading operation. Consequently, it is possible to avoid the output vertical back porch period and the output vertical sync signal pulse period from being varied while tearing is prevented.

A memory control device in accordance with ninth aspect of the present invention may be an arrangement of the second aspect, wherein in the case where the reading operation is higher in operation rate than the writing operation, the risky period is set as a time period from (i) a time point preceding the end of the reading operation by a length of the writing period to (ii) start of a vertical sync signal, and transfer of the data from the host to the frame memory is started, upon completion of transmission and reception of request information and permission information between the host and the display control section, the request information being indicative of a request to start the writing operation, the permission information being in response to the request information and indicative of permission to start the writing operation.

With the arrangement, the risky period is set as a time period from (i) a time point preceding the end of the reading operation by a length of the writing period to (ii) start of a vertical sync signal. Transfer of the data from the host to the frame memory is started, upon completion of transmission and reception of request information and permission information between the host and the display control section, the request information being indicative of a request to start the writing operation, the permission information being in response to the request information and indicative of permission to start the writing operation. Consequently, it is possible to avoid the output vertical back porch period and the output vertical sync signal pulse period from being varied while tearing is prevented.

A memory control device in accordance with tenth aspect of the present invention may be an arrangement of the third aspect, wherein in the case where the writing operation is higher in operation rate than the reading operation, the risky period is set as a time period from (i) start of a vertical sync signal to (ii) a time point preceding the end of the reading operation by a length of the writing period, and transfer of the data from the host to the frame memory is started, upon completion of transmission and reception of request information and permission information between the host and the display control section, the request information being indicative of a request to start the writing operation, the permission information being in response to the request information and indicative of permission to start the writing operation.

With the arrangement, the risky period is set as a time period from (i) start of a vertical sync signal to (ii) a time point preceding the end of the reading operation by a length of the writing period. Transfer of the data from the host to the frame memory is started, upon completion of transmission and reception of request information and permission information between the host and the display control section, the request information being indicative of a request to start the writing operation, the permission information being in response to the request information and indicative of permission to start the writing operation. Consequently, it is possible to avoid the output vertical back porch period and the output vertical sync signal pulse period from being varied while tearing is prevented.

A mobile terminal in accordance with eleventh aspect of the present invention preferably comprises any one of the aforementioned memory control devices.

With the arrangement, it is possible to realize a mobile terminal capable of avoiding a frame from being dropped and reducing wasteful power consumption such as power consumed while a host waits.

Each of the sections of the memory control device may be realized by a computer. In this case, the present invention also encompasses (i) a memory control program for causing a computer to operate as each of the sections so as to realize the memory control device by the computer and (ii) a computer-readable storage medium in which the memory control program is stored.

[Other Expression of the Present Invention]

The present invention can be also expressed as follows.

That is, a (always updatable) frame buffer of the present invention may be arranged such that whether an image input rate is higher than an image output rate or not is set beforehand, and when the image input rate is slower than the output rate for liquid crystals and when an image input starts in a predetermined "risky period", an output line counter may be suspended in accordance with image input timing. This allows tearing from being prevented every time when an image input starts.

The frame buffer of the present invention may be arranged such that in a case where the image input rate is higher than the image output rate, when an image input is intended to be started within a predetermined "risky period", the host may handshake so as to wait until the risky period passes. Consequently, an image input is started without generating tearing, and the image input is not requested to wait other than within the risky period.

The frame buffer of the present invention may be arranged such that in a case where an image input is intended to be started at substantially the same time as timing to start an output, in order to surely stop the reading operation of image data before the image input, reading of the image is suspended just before the image input with use of triggers preceding actual image data. Examples of the triggers include a VSS (Vsync Start) packet in a case of an MIPI video mode, a write memory start command of a DCS command in a case of an MIPI command mode, start of a Vsync signal in a case of a parallel/LVDS input, and a BS (Blanking Start) packet in a case of DP (Display Port). Using these triggers, it is possible to surely prevent tearing.

The frame buffer of the present invention may be arranged so as to wait for reception of an image input with use of, as handshaking means for a case where an image input rate is larger than image output rate, handshaking by register polling, handshaking by a BusTurnAround function in a case of MIPI command mode, handshaking by a REA/ACK signal, handshaking by a pulse signal which is not toggled in the risky period, handshaking by a level signal which indicates the risky period by its level, or handshaking by an asynchronous wait function in a case of an asynchronous bus.

The present invention may be arranged such that for the purpose of driving a liquid crystal panel using a semiconductor oxide (hereinafter referred to as "semiconductor oxide liquid crystal panel". An example of the oxide is an oxide of a compound constituted by indium, gallium, and zinc), a front porch period of a vertical sync period at image output timing is automatically incremented by a predetermined time period with respect to each frame when no image input occurs, an image output cycle is made longer gradually, and a VF period is reset to the minimum set period immediately after occurrence of an image input. This realizes a function which, in a case where drawing is updated, causes updating of drawing to be reflected on display immediately after the updating of drawing, and in a case where no drawing is updated, automatically delays a liquid crystal driving cycle so as to automatically reduce power consumption. In a case where a function which requires a display output for some time, such as an automatic backlight control, is used, the function which automatically delays a cycle may be made off.

The frame buffer of the present invention may be arranged such that in a case where an image input rate is lower than a rate of output to liquid crystal, a condition to reset a set VF period is start of transfer of an image in a time period from end of a risky period to end of an image output, the frame buffer starts the reading operation of image data after the frame buffer has waited for a preset delay period. This allows surely causing updating of drawing to be reflected on liquid crystal display immediately after the updating of drawing and preventing tearing.

As described above, since the frame buffer of the present invention is arranged such that in the case where the image input rate is lower than the rate of output to liquid crystal, tearing is prevented regardless of when an image input starts. This allows preventing a frame from being dropped, elongating a time for a host to be idle, and reducing power consumption as a whole.

Furthermore, in a case where the image input rate is higher than the image output rate, handshaking by the host allows preventing tearing from being generated and reducing the host to be idle.

Furthermore, the present invention may be arranged such that in a case where drawing is updated, updating of drawing is reflected on display immediately after the updating of drawing, and in a case where no drawing is updated, a liquid crystal driving cycle is automatically delayed. This realizes a function for automatically reducing power consumption. This allows automatically controlling a driving method suitable for a semiconductor oxide liquid crystal panel.

Furthermore, an automatic backlight control etc. can be used.

(Automatic Suspend Driving)

The frame buffer of the present invention may be arranged such that a set VF period can be incremented by VF(inc) from VF(min) to VF(max) with respect to each VF(step) frame cycle (automatic suspend driving).

The frame buffer of the present invention may be arranged such that a set VF period is changed to VF(min) immediately after an image input (automatic refresh).

The frame buffer of the present invention may be arranged so as to have a mode in which a set VF period is fixed to VF(min) in a case of using an image processing circuit (normal refresh).

(Input Rate Reference)

The frame buffer of the present invention may be arranged such that whether "Tin>Tout" or "Tin<Tout" is set (reference for whether input is fast or slow).

(Case where Image Input is Slow)

The frame buffer of the present invention may be arranged such that "Tin−Tout+margin" before a predetermined read period is set as a risky period (based on TG output, setting of risky period).

The frame buffer of the present invention may be arranged such that in a case where image transfer starts in the "risky period", the frame buffer suspends a line counter of an output TG, waits for setting of output delay, and proceeds to VP (counter suspension reference).

The frame buffer of the present invention may be arranged such that in a case where whether image input is started or not is determined in a DSI video mode, a VSS packet may be transmitted (line counter is suspended from reception of VSS to start of image input) (stopping-just-before trigger; MIPI video mode).

The frame buffer of the present invention may be arranged such that in a case where whether image input is started or not is determined in a DSI command mode, a write memory start command may be transmitted (line counter is suspended from reception of a write memory start command to start of image input) (stopping-just-before trigger; MIPI command mode).

The frame buffer of the present invention may be arranged such that in a case where whether image input is started or not is determined with parallel/LVDS, Vsync may be started (line counter is suspended from start of Vsync to start of image input) (stopping-just-before trigger; parallel/LVDS).

The frame buffer of the present invention may be arranged such that in a case where whether image input is started or not is determined with DP, a BS packet may be transmitted (line counter is suspended from reception of a BS packet to start of image input) (stopping-just-before trigger; DP).

The frame buffer of the present invention may be arranged such that in a case where transfer of image is started during a time period from end of a risky period to end of an image output, the frame buffer may wait for setting of output delay (and wait for elapse of VF(min) period) and then proceed to VP (automatic refresh reference).

The frame buffer of the present invention may be arranged such that output delay corresponding to "Tin−Tout+margin" is set after start of image input (setting of output delay).

The frame buffer of the present invention may be arranged such that timing to end "risky period" is set to be on or before start of Vsync from an output TG, and timing which meets VP+VB(in)>VP+VB(out) is set.

The frame buffer of the present invention may be arranged such that timing to end "risky period" is set to be on or before start of Vsync from an output TG, and a host is made to wait by register handshaking during a time period of VP+VB(out).

(Case where Image Input is Fast)

The frame buffer of the present invention may be arranged such that a former half "Tin−Tout+margin" of a predetermined read period is set as a risky period (setting of risky period).

The frame buffer of the present invention may be controlled such that a sender handshakes so that transfer of image data is not started during the "risky period".

The frame buffer of the present invention may be arranged such that after the frame buffer transmits an ACK signal in response to a REQ signal, the frame buffer suspends a line counter when timing to read an image comes before image input, and the line counter is resumed when image input is started (waiting for output after ACK).

The frame buffer of the present invention may be arranged such that after setting handshake=1, when it is not within the "risky period", the handshake is restored to 0, and the host makes polling of a register and starts transfer of image data if handshake=0 (register handshake).

The frame buffer of the present invention may be arranged such that when transfer of image data is started during a "risky period", start of the transfer is made to wait by a Bus Turnaround function (wait by BTA<MIPI command mode>).

The frame buffer of the present invention may be arranged such that after the host outputs REQ=High, when it is not within the risky period, ACK=1 is outputted, and then the host makes polling of a terminal and starts transfer of image data if ACK=1 (REQ/ACK signal).

The frame buffer of the present invention may be arranged such that a High level signal is outputted during the risky period and a pulse signal is outputted during other period with a set cycle, and the host waits for an edge of the pulse signal and confirms its level, and starts transfer of image data (pulse signal).

The frame buffer of the present invention may be arranged such that a High level signal is outputted during the risky period and a Low level signal is outputted during other period, and the host makes polling of the signal level, and starts transfer of image data (level signal).

[Additional Matter]

The present invention is not limited to the description of the embodiments above, but may be altered by a skilled person within the scope of the claims. An embodiment based on a proper combination of technical means disclosed in different embodiments is encompassed in the technical scope of the present invention. Furthermore, a new technical feature can be formed by combining technical means disclosed in different embodiments.

INDUSTRIAL APPLICABILITY

The present invention is applicable to a memory control device etc. which conducts (i) a writing operation in which data transferred from a host processor is written in a frame memory and (ii) a reading operation in which the data is read out from the frame memory so as to transfer the data thus read out to a display panel.

REFERENCE SIGNS LIST

1 Image transfer system
2 Host processor
3 LCD controller
4 LCD
10 Mobile terminal
31 Frame memory
32 Delay control section (Delay section)
33 Period control section (period adjusting section)
34 Determination section
35 Control register
Tin Writing period
Tout Readout period

The invention claimed is:

1. A memory control device which conducts (i) a writing operation in which data transferred from a host is written in a frame memory and (ii) a reading operation in which the data is read out from the frame memory so as to transfer the data to a display, the memory control device comprising:

a Liquid Crystal Display (LCD) controller connected to the frame memory; wherein the LCD controller determines, in a case where a readout period from start of the reading operation to end of the reading operation is different in length from a writing period from start of the writing operation to end of the writing operation, whether start of the writing operation falls within a risky period which is predetermined based at least on a difference between the readout period and the writing period;

the LCD controller delays, in a case where the LCD controller determines that the start of the writing operation falls within the risky period, the start of one of the reading operation and the writing operation which one is higher in operation rate, said one of the reading operation and the writing operation being delayed by a predetermined delay period which is predetermined based on a difference between the readout period and the writing period;

in a case where the reading operation is higher in operation rate than the writing operation, the risky period is set as a time period from (i) a time point preceding the end of the reading operation by a length of the writing period to (ii) the start of the reading operation; and in a case where the writing operation is higher in operation rate than the reading operation, the risky period is set as a time period from (i) the start of the reading operation to (ii) the time point preceding the end of the reading operation by the length of the writing period.

2. The memory control device as set forth in claim 1, wherein
the LCD controller delays, in a case where it is determined that the start of the writing operation falls within the risky period, the start of the reading operation by suspending, by the delay period, a line counter for generating a line address used in transferring the data to the display.

3. The memory control device as set forth in claim 1, wherein
the LCD controller delays, in a case where it is determined that the start of the writing operation falls within the risky period, the start of the writing operation by delaying transmission and reception of permission information in response to request information in a sequence control until the start of the writing operation no longer falls within the risky period, the sequence control being a control in which transfer of the data from the host to the frame memory is started upon completion of transmission and reception of the request information and the permission information between the host and the display, the request information being indicative of a request to start the writing operation, the permission information being in response to the request information and indicative of permission to start the writing operation.

4. The memory control device as set forth in claim 3, wherein
the LCD controller further determines whether the start of the reading operation falls within a time period from (i) the transmission and reception of the permission information in response to the request information between the host and the display to (ii) start of transfer of the data from the host to the frame memory, and
in a case where the LCD controller determines that the start of the reading operation falls within a time period from (i) a time point of completion of the transmission and reception of the permission information in response to the request information between the host and the display to (ii) the start of transfer of the data from the host to the frame memory, the LCD controller suspends a line counter to generate a line address used in transferring the data to the display.

5. The memory control device as set forth in claim 2, wherein when the LCD controller receives, during the risky period, information which is always transferred before the writing operation of the data, LCD controller determines that the start of the writing operation of the data falls within the risky period.

6. The memory control device as set forth in claim 1, wherein
the LCD controller adjusts a length of a front porch period of each frame period in the reading operation of the data,
the LCD controller determines whether or not the start of the writing operation falls within a time period from end of the risky period to end of the reading operation of data in a previous frame,
in a case where the LCD controller determines that the start of the writing operation falls within the period from the end of the risky period to the end of the reading operation of the data in a previous frame, the LCD controller advancing the start of the reading operation of the data by causing the length of the front porch period to be equal to or shorter than a length of a front porch period in the previous frame, and
in a case where the LCD controller does not determine that the start of the writing operation falls within the period from the end of the risky period to the end of the reading operation of data in the frame previous to the data, the LCD controller causing the length of the front porch period to be equal to or longer than the length of the front porch period in the previous frame.

7. The memory control device as set forth in claim 1, wherein
the LCD controller determines whether or not the start of the writing operation falls within a time period from end of the risky period to the end of the reading operation, and
in a case where the LCD controller determines that the start of the writing operation falls within the period from the end of the risky period to the end of the reading operation, the LCD controller delays the start of the reading operation by the delay period.

8. The memory control device as set forth in claim 2, wherein
in the case where the reading operation is higher in operation rate than the writing operation,
the risky period is set as a time period from (i) a time point preceding the end of the reading operation by a length of the writing period to (ii) start of a vertical sync signal, and
the LCD controller delays the start of the writing operation so that a time period which is a sum of a vertical front porch period and a vertical sync signal pulse period for the writing operation is longer than a time period which is a sum of a vertical front porch period and a vertical sync signal pulse period for the reading operation.

9. The memory control device as set forth in claim 2, wherein
in the case where the reading operation is higher in operation rate than the writing operation,
the risky period is set as a time period from (i) a time point preceding the end of the reading operation by a length of the writing period to (ii) start of a vertical sync signal, and
transfer of the data from the host to the frame memory is started, upon completion of transmission and reception of request information and permission information between the host and the display, the request information being indicative of a request to start the writing operation, the permission information being in response to the request information and indicative of permission to start the writing operation.

10. The memory control device as set forth in claim 3, wherein
in the case where the writing operation is higher in operation rate than the reading operation,
the risky period is set as a time period from (i) start of a vertical sync signal to (ii) a time point preceding the end of the reading operation by a length of the writing period, and
transfer of the data from the host to the frame memory is started, upon completion of transmission and reception of request information and permission information between the host and the display, the request information being indicative of a request to start the writing operation, the permission information being in response to the request information and indicative of permission to start the writing operation.

11. A mobile terminal, comprising a memory control device as set forth in claim 1.

12. A non-transitory computer-readable recording medium, in which a memory control program for causing a computer to function as a memory control device as set forth in claim 1 is recorded, the memory control program causing the computer to function as the LCD controller of the memory control device.

* * * * *